United States Patent
Mera et al.

(10) Patent No.: US 7,776,994 B2
(45) Date of Patent: Aug. 17, 2010

(54) RESIN PARTICLE DISPERSION LIQUID, AND METHOD FOR PRODUCING THE SAME

(75) Inventors: Fumiaki Mera, Kanagawa (JP); Hirotaka Matsuoka, Kanagawa (JP); Satoshi Hiraoka, Kanagawa (JP); Yuki Sasaki, Kanagawa (JP); Yasuo Matsumura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 544 days.

(21) Appl. No.: 11/730,147

(22) Filed: Mar. 29, 2007

(65) Prior Publication Data

US 2008/0038646 A1 Feb. 14, 2008

(30) Foreign Application Priority Data

Aug. 14, 2006 (JP) .............................. 2006-220873

(51) Int. Cl.
*C08G 63/02* (2006.01)
(52) U.S. Cl. ...................................... 528/272; 428/327
(58) Field of Classification Search .................. 430/48, 430/109.4, 111.4; 528/272; 428/327
See application file for complete search history.

(56) References Cited

U.S. PATENT DOCUMENTS 7,473,511 B2 * 1/2009 Matsumura et al. .... 430/137.14

2006/0263709 A1 * 11/2006 Matsumura et al. ......... 430/105

FOREIGN PATENT DOCUMENTS

| JP | A 9-296100 | 11/1997 |
| JP | A 2000-26709 | 1/2000 |
| JP | A 2000-191892 | 7/2000 |
| JP | A 2002-351140 | 12/2002 |

* cited by examiner

*Primary Examiner*—John L Goodrow
(74) *Attorney, Agent, or Firm*—Oliff & Berridge, PLC

(57) ABSTRACT

A resin particle dispersion liquid comprises: resin particles comprising polyester having terminal carboxyl groups, the polyester being obtained by polycondensation of a polycondensable monomer, wherein the polyester has the terminal carboxyl groups that are partially neutralized to form carboxyl anions, the resin particles in the resin particle dispersion liquid having a value of $(d_a/(d_a+d_c))$ of from approximately 0.30 to approximately 0.90, when in an absorption spectrum of the resin particles measured with an infrared spectrometer, $d_c$ represents a peak intensity of the terminal carboxyl group in a range of from 1,780 to 1,680 $cm^{-1}$, and $d_a$ represents a peak intensity of the neutralized carboxyl anion in a range of from 1,670 to 1,550 $cm^{-1}$, the polyester has an acid value of approximately 1 mg·KOH/g or more and less than approximately 15 mg·KOH/g before neutralization, the resin particles dispersion liquid comprises a divalent or higher organic acid in an amount of from approximately 0.1 to approximately 20 parts by weight per 100 parts by weight of the resin particles, and the resin particles have a median diameter of from approximately 0.1 to approximately 2.0 μm.

9 Claims, No Drawings

RESIN PARTICLE DISPERSION LIQUID, AND METHOD FOR PRODUCING THE SAME

CROSS-REFERENCE TO RELATED APPLICATIONS

This application is based on and claims priority under 35 USC 119 from Japanese Patent Application No. 2006-220873 filed Aug. 14, 2006.

BACKGROUND (i) Technical Field

The present invention relates to a toner for developing an electrostatic image that is used upon developing an electrostatic latent image, which is formed by an electrophotographic process, an electrostatic recording process or the like, with a developer, a method for producing the toner, a resin particle dispersion liquid that can be used as a raw material of the toner, and a method for producing the resin particle dispersion liquid. The invention also relates to a developer for developing an electrostatic image and a method for forming an image using the toner for developing an electrostatic image.

(ii) Related Art

As an ordinary polycondensing method for obtaining a polyester resin for a toner for developing an electrostatic image, particularly an amorphous polyester (which is also referred to as non-crystalline polyester in some cases), such a method has been employed that requires large energy, i.e., agitation with large motive energy at a high temperature exceeding 200° C. due to the low reactivity of the monomer, and a reaction time far more than 10 hours under highly reduced pressure.

Upon producing a polyester resin having low reactivity, a metallic catalyst having high activity in a high temperature range has been generally used.

However, the technique using a Bronsted acid containing sulfur atoms as a polycondensation catalyst of polyester is capable of attaining low temperature polymerization at 150° C. or lower, and is significantly important for the global environmental protection from the standpoint of reduction in total production energy of a toner.

A method for producing a polyester resin aqueous dispersion liquid includes such related-art methods as a solution method, a phase inversion emulsification method and a high temperature emulsification method. The solution method requires large investment in recovery equipments and is not favorable from the standpoint of environmental safety, and it also has a problem in image quality, such as fogging in a non-image area caused by a remaining solvent of the toner, since the solvent cannot be completely removed.

For producing self-emulsifying polyester, a hydrophilic polymer having a particular structure of a salt thereof (sulfonylphthalic acid, such as sulfonic acid or an alkaline neutralized salt thereof, such as PDPS) has been used, but it has a problem in practical use due to reduction in volume resistivity and deterioration of charging property in a high temperature and high humidity environment, upon using as a resin for a toner.

SUMMARY

A resin particle dispersion liquid comprising: resin particles comprising polyester having terminal carboxyl groups, the polyester being obtained by polycondensation of a polycondensable monomer, wherein the polyester has the terminal carboxyl groups that are partially neutralized to form carboxyl anions, the resin particles in the resin particle dispersion liquid having a value of $(d_a/(d_a+d_c))$ of from approximately 0.30 to approximately 0.90, when in an absorption spectrum of the resin particles measured with an infrared spectrometer, $d_c$ represents a peak intensity of the terminal carboxyl group in a range of from 1,780 to 1,680 cm$^{-1}$, and $d_a$ represents a peak intensity of the neutralized carboxyl anion in a range of from 1,670 to 1,550 cm$^{-1}$, the polyester has an acid value of approximately 1 mg·KOH/g or more and less than approximately 15 mg·KOH/g before neutralization, the resin particles dispersion liquid comprises a divalent or higher organic acid in an amount of from approximately 0.1 to approximately 20 parts by weight per 100 parts by weight of the resin particles, and the resin particles have a median diameter of from approximately 0.1 to approximately 2.0 µm.

DETAILED DESCRIPTION

The invention will be described in detail below with reference to embodiments thereof.

(Resin Particle Dispersion Liquid)

The resin particle dispersion liquid of the invention contains at least resin particles containing polyester having terminal carboxyl groups, which are obtained by polycondensation of a polycondensable monomer. The polyester has the terminal carboxyl groups that are partially neutralized to form carboxyl anions. The resin particles in the resin particle dispersion liquid have a value of $(d_a/(d_a+d_c))$ of from approximately 0.30 to approximately 0.90, wherein in an absorption spectrum of dried resin particles, which are obtained by drying the resin particles in air, measured with an infrared spectrometer, $d_c$ represents a peak intensity of C=O stretching vibration of the terminal carboxyl groups in a range of from 1,780 to 1,680 cm$^{-1}$, and $d_a$ represents a peak intensity of $CO_2^-$ antisymmetrical stretching vibration of the neutralized carboxyl anions in a range of from 1,670 to 1,550 cm$^{-1}$. The polyester has an acid value of 1 mg·KOH/g or more and less than 15 mg·KOH/g before neutralization. The resin particle dispersion liquid contains a divalent or higher organic acid (which is hereinafter referred to as a polyvalent acid in some cases) in an amount of from 0.1 to 20 parts by weight per 100 parts by weight of the resin particles. The resin particles have a median diameter of from 0.1 to 2.0 µm.

The resin particle dispersion liquid of the invention is suitable for a resin particle dispersion liquid for a toner for developing an electrostatic image.

The production of a polyester resin at a low temperature of 150° C. or lower without using the related-art production methods consuming large amounts of energy is significantly important for reduction in total energy consumed in production of the resin and the toner, and it is preferred to use a polycondensation catalyst for carrying out the polycondensation at a low temperature of 150° C. or lower, which is lower than the related-art methods by about 100° C.

In order to establish a method for producing a toner with a consistent low environmental load, it is preferred to produce a toner by using such a resin particle dispersion liquid that is of a non-solvent system that is different from the related-art emulsification method and is free of the aforementioned problems at 100° C. or lower, in addition to the use of the aforementioned low temperature polycondensation resin as a raw material.

As a method for realizing low temperature emulsification at 100° C. or lower in a non-solvent system, for example, such a method (neutralization emulsification method) can be exemplified that an alkali solution is added to a resin, followed by immersing and agitating, to alkali-neutralize terminal carboxyl groups (COOH groups) of molecular chains constituting the resin through elimination of protons (to form COO⁻), whereby the catalyst is inactivated, and self-emulsification power is imparted to the resin.

Upon producing a toner by using the resin particle dispersion liquid produced by the related-art neutralization emulsification method, however, such problems may occur that fogging occurs in a non-image part in a high temperature and high humidity condition, and unevenness of secondary colors occurs in a fixed image, due to unevenness in particle size distribution, maldistribution of the composition, and occurrence of a slight amount of a hydrophilic component, in the resin particle dispersion liquid produced by the related-art neutralization emulsification method.

As a method for obtaining a resin particle dispersion liquid that eliminates the problem, for example, such a method can be exemplified that the amount of an alkali used for neutralization is controlled to change the characteristics of the resin particle dispersion liquid in some extent.

In the case where the alkali equivalent is extremely short with respect to the terminal carboxyl groups of the resin, the degree of alkali neutralization of the terminal carboxyl groups of the resin is lowered to impair dispersion of the resin, whereby the resin partially remains insoluble, a sufficient solid concentration (S.C.) cannot be obtained, and a dispersion liquid having a favorable median diameter (from 0.1 to 2.0 μm) without maldistribution of the composition cannot be obtained.

In the case where an excessive amount of alkali is present with respect to the terminal carboxyl groups of the resin, the terminal carboxyl groups of the resin are completely neutralized (to COO⁻), and all the molecular chains of the resin form salts, whereby the resin does not form emulsion since the resin is completely dissolved in water, or the dispersed polyester particles having been excessively neutralized are increased in viscosity and are precipitated due to formation of aggregated particles, so as to separate the dispersion liquid into water and the polyester.

The inventors have found that compositional maldistribution, unevenness in particle size distribution and occurrence of distribution in hydrophilicity are caused, for example, by the following factors including variations of molecular chains. A resin obtained by polycondensation contains molecular chains having various molecular weights and acid values and thus has a molecular weight distribution, an acid value distribution and a difference in hydrophilicity, and furthermore, resins among dispersion liquids also have fluctuations in various characteristics values, such as a molecular weight, a molecular weight distribution, an acid value and a hydrophilicity. In the microscopic view of the resin, molecular chains having high hydrophilicity owing to a small molecular weight are liable to be neutralized and dispersed to form a hydrophilic component, but molecular chains having a large molecular weight is hard to be neutralized and dispersed.

As a method for emulsifying a resin without the aforementioned problems, the inventors have found as follows. A neutralization degree of resin terminals is controlled to a prescribed range to suppress the amount of an alkali neutralizing agent necessary for dispersing polyester to a minimum amount, whereby aggregation and precipitation of the resin particles in the resin particle dispersion due to compositional maldistribution, unevenness in particle size distribution and excess of alkali can be prevented. As a result, a toner using the dispersion liquid as a raw material can be prevented from suffering the problems, such as fogging in a non-image area and unevenness in gloss of secondary colors.

The emulsification process in the aforementioned method is effective to a polyester resin having a high acid value of 15 mg·KOH/g or more, but there are some cases where a sufficient solid concentration (S.C.) cannot be obtained with a resin having a low acid value of less than 15 mg·KOH/g, and particularly 10 mg·KOH/g or less, due to the low self-emulsification power thereof.

This is because of the following reason. In the so-called neutralization emulsification method, in which carboxyl groups (COOH groups) at molecular chain terminals of the resin are alkali-neutralized (COO⁻) to impart self-emulsification power to the resin, the amount of the terminal COOH groups is small in the resin, whereby self-emulsification power cannot be sufficiently obtained to make dispersion in water difficult.

In the related-art alkali-neutralization method, an aqueous dispersion liquid having a sufficient solid concentration can be obtained with a resin having a high acid value of 15 mg·KOH/g or more, but there is a problem of difficulty in obtaining a sufficient solid concentration of 30% or more with a resin having a low acid value of less than 15 mg·KOH/q, and particularly 10 mg·KOH/g or less.

The invention is to provide a production method by emulsification that can provide a sufficient solid concentration with a resin having an acid value of less than 15 mg·KOH/g.

A toner produced by using polyester having an acid value of 15 mg·KOH/g or more as a raw material has such a significant problem that upon storing under a high humidity condition for a prolonged period of time, charge leakage due to moisture absorption or unevenness in charge caused thereby brings about a significant difference in image density among solid images of the first print and the print obtained after printing 50,000 sheets.

In order to avoid the aforementioned defect in image quality, it has been necessary to use a resin having a low acid value of less than 15 mg·KOH/g, but a resin particle dispersion liquid for a toner is difficult to produce by the related-art alkali-neutralizing method with the resin having a low acid value.

According to the invention, on the other hand, the resin particle dispersion liquid contains a divalent or higher organic acid in an amount of from approximately 0.1 to approximately 20 parts by weight per 100 parts by weight of the resin, whereby the resin is improved in self-emulsification power even with a resin having a low acid value 1 mg·KOH/g or more and less than 15 mg·KOH/g, and such a resin particle dispersion liquid can be obtained that has a sufficient solid concentration of from 30 to 50%.

The reason why the emulsification property upon using a resin having a low acid value is improved by using a divalent or higher organic acid to obtain a resin particle dispersion liquid having a sufficient solid concentration is that the polyvalent acid used herein exerts a surface active function, and plasticization of the resin is accelerated with the fatty acid to improve the self-emulsification power.

The divalent or higher organic acid that can be used in the invention is considerably high in hydrophilicity owing to the high valence thereof. The resin that is bonded to the polyvalent acid with a hydrogen bond formed between the terminal of the resin and the polyvalent acid, and is dispersed from a bulk resin into the aqueous medium in the manner of extracting with the polyvalent acid having high hydrophilicity, and thus the so-called self-emulsification power is improved.

The polyvalent acid is oriented on the surface of the resin particles dispersed in the aqueous medium through exhibition of the surface active function, whereby the resin particles dispersed in the aqueous medium are stabilized as primary particles.

The divalent or higher organic acid in the invention is not particularly limited as far as it is an organic acid having two or more acid group, and is preferably an acid having an aromatic ring group and two or more carboxyl groups, such as trimellitic anhydride, trimellitic acid, trimesic acid and pyromellitic acid.

Examples of the acid group include a carboxyl group, a sulfo group and a group equivalent to these groups (such as an acid anhydride group).

Upon producing the resin particle dispersion liquid of the invention, the divalent or higher organic acid may be added immediately before completing the polycondensation or after completing the polycondensation, whereby the acid is partially polycondensed with the resin or partially crosslinked therewith, or may be dissolved in an aqueous medium used for emulsification. The acid is preferably added to the aqueous medium since the surface active function can be highly exhibited.

The addition amount of the polyvalent acid that can be used in the invention is generally from 0.1 to 20 parts by weight, preferably from 0.1 to 15 parts by weight, and more preferably from 0.2 to 10 parts by weight, per 100 parts by weight of the resin particles. The polyvalent acid and a salt thereof can be removed by washing after producing the toner particles. In the case where the polyvalent acid is present in a larger amount than the aforementioned range, the polyvalent acid monomer may remain even by washing after producing the toner particles, and the remaining polyvalent acid may affect the charging characteristics and particularly may contribute to charge leakage under a high temperature and high humidity condition. Furthermore, the resin particle dispersion liquid is liable to be acidic, i.e., low pH, upon emulsification, which brings about use of a large amount of a base upon neutralization emulsification, so as to fail to obtain a resin particle dispersion liquid having a sufficient solid concentration.

In the case where the addition amount of the polyvalent acid is less than the aforementioned range, the effect of addition of the polyvalent acid cannot be sufficiently obtained to fail to attain sufficient dispersibility in water, whereby a resin particle dispersion liquid having a sufficient solid concentration may not be obtained, and resin particles having an intended particle diameter may not be obtained due to insufficient surface active function.

The polyester contained in the resin particles in the resin particle dispersion liquid of the invention has an acid value of approximately 1 mg·KOH/g or more and less than approximately 15 mg·KOH/g, preferably from 1 to 10 mg·KOH/g, and more preferably from 2 to 10 mg·KOH/g, before neutralization. In the case where the acid value is approximately 15 mg KOH/g or more, a toner produced by using the polyester suffers a problem of large difference in density of solid images between the first print and the print obtained after printing 50,000 sheets due to charge leakage due to moisture absorption and unevenness in charge caused thereby occurring upon storing in a high humidity condition for a long period of time, and a problem of difficulty in obtaining a sufficient solid concentration of 30% or more. In the case where the acid value is less than 1 mg·KOH/g, upon aggregating and integrating with a pigment and a releasing agent under heat, the concentration of the carboxylic acid on the surface of the particles becomes too small, whereby coarse particles are liable to occur upon aggregation, uniform integration may be difficult upon aggregation and integration, and fine particles occur due to insufficient integration to fail to obtain a toner having a uniform particle size distribution.

The acid value of the polyester before neutralization referred herein is such an acid value that is derived from the total amount of carboxyl groups and neutralized carboxyl groups in the polyester.

The acid value may be measured by a method according to a known potentiometric titration method disclosed in JIS K0070 (1992). Even after neutralization of the polyester, the acid value can be obtained, for example, in such a manner that carboxyl groups of the polyester is made into a state that is not neutralized by reacting with an acid or an acidic solution to remove the neutralized components, followed by washing with water thoroughly, and the acid value before neutralization is measure, or in such a manner that the acid value of the polyester after neutralization and the neutralization amount of the neutralized polyester are measured, and the acid value converted from the neutralization amount is added to the acid value after neutralization to obtain the total acid value.

The resin particle dispersion of the invention preferably contains a monocarboxylic acid having 4 or more carbon atoms and/or a salt thereof in an amount of from 0.05 to 5.0 parts by weight per 100 parts by weight of the resin particles. The monocarboxylic acid having 4 or more carbon atoms and/or a salt thereof is preferably added since the dispersibility of the resin having a low acid value in water can be largely improved.

The improvement in self-emulsification power by adding a fatty acid, such as a monocarboxylic acid having 4 or more carbon atoms is ascribable to enhancement of the plasticity. The addition of a fatty acid is effective particularly to emulsification of a resin having a high glass transition temperature (Tg) owing to acceleration of dispersion of the resin in water through plasticization.

Examples of the monocarboxylic acid having 4 or more carbon atoms include butanoic acid, heptanoic acid, hexanoic acid, heptanoic acid, octanoic acid, nonanoic acid, decanonic acid, dodecanonic acid, tetradecanoic acid, pentadecanoic acid, hexadecanoic acid, heptadecanoic acid, octadecanoic acid, itaconic acid, docosanoic acid, tetracosanoic acid, hexacosanoic acid, octacosanoic acid and triacontanoic acid.

The monocarboxylic acid having 4 or more carbon atoms is not limited to a saturated fatty acid, and an unsaturated fatty acid, such as oleic acid, linoleic acid and linolenic acid, or a salt thereof may be used.

The monocarboxylic acid having 4 or more carbon atoms is preferably added after completing polycondensation and before emulsification for improving dispersibility in an aqueous medium through plasticization of the resin, and agitation is preferably conducted for 3 minutes or more.

In order to plasticize the resin to facilitate dispersion in an aqueous medium, such a production method may be employed that the fatty acid is added simultaneously with neutralization. The fatty acid added not only is effective for plasticization of the resin, but also has a surface active function by orientation on the resin particles dispersed in an aqueous medium, which contributes to stabilization of primary particles.

The addition amount of the monocarboxylic acid having 4 or more carbon atoms that can be used in the invention is preferably from 0.02 to 10 parts by weight, more preferably from 0.05 to 7.5 parts by weight, and further preferably from 0.1 to 5 parts by weight, per 100 parts by weight of the resin particles.

The monocarboxylic acid having 4 or more carbon atoms or a salt thereof may be removed by washing the toner particles after production thereof, and the monocarboxylic acid having 4 or more carbon atoms or a salt thereof may be removed by washing the toner particles after production thereof. It is preferred that the addition amount of the monocarboxylic acid having 4 or more carbon atoms is 10 parts by weight or less, since the monocarboxylic acid having 4 or more carbon atoms can be removed by washing the toner particles after production thereof, good charging characteristics can be obtained, and charge leakage is hard to occur under a high temperature and high humidity condition. It is also preferred since upon emulsification of the resin, the resin particle dispersion liquid is not liable to be acidic, i.e., low pH, and thus a large amount of a base may not be used upon neutralization emulsification, whereby a resin particle dispersion liquid having a sufficient solid concentration can be obtained.

In the case where the addition amount of the monocarboxylic acid having 4 or more carbon atoms is 0.02 part by weight or more, the effect of the addition thereof can be sufficiently obtained, whereby plasticization occurs to impart dispersibility in water to the resin sufficiently, a resin particle dispersion liquid having a sufficient solid concentration can be obtained, and resin particles having an intended particle diameter can be obtained through sufficient surface active effect.

In the invention, a neutralizing agent is preferably used for neutralizing the terminal carboxyl groups of the polyester. The neutralizing agent that can be used in the invention is not particularly limited as far as it can under go neutralization reaction with carboxyl groups of the polyester resin, and examples thereof include a metallic hydroxide represented by a chemical formula $M(OH)_n$ (wherein M represents an alkali metal or an alkaline earth metal, and n represents 1 or 2) and an ammonium compound.

The neutralizing agent that can be used in the invention is preferably, among these, an alkali metal hydroxide or an alkaline earth metal hydroxide, and is particularly preferably sodium hydroxide. The alkali metal hydroxide and alkaline earth metal hydroxide have low volatility as being different from an ammonium compound, and are convenient in controlling pH upon production as compared to an ammonium compound, whereby the neutralization degree can be easily controlled.

The neutralizing agent may also be used as a solution of an aqueous medium or an organic solvent.

In the case where a polyester aqueous dispersion liquid is to be obtained, a surfactant, such as a nonionic surfactant and an anionic surfactant described later, may be added as an emulsification assistant.

In the case where emulsification is effected by using the neutralizing agent in the invention, it is important that the degree of neutralization of the terminal carboxyl groups (neutralization degree) in the resin particle dispersion liquid is from approximately 0.30 to approximately 0.90 in terms of a value of the following expression (1).

The neutralization degree of the resin terminals can be obtained by measuring an infrared absorption spectrum with an IR analyzer (infrared spectroscopy).

In the infrared absorption spectrum, an R—COOH group (wherein R represents a hydrocarbon group) has an infrared absorption peak around from 1,780 to 1,680 $cm^{-1}$, and an R—COO$^-$ group formed through elimination of a proton has an infrared absorption peak around from 1,670 to 1,550 $cm^{-1}$. Specifically, in the case of a saturated aliphatic carboxyl group, the peak of the carboxyl group appears around 1,770 $cm^{-1}$, and the peak of an anion thereof appears around 1,660 $cm^{-1}$. In the case of a special carboxyl group or carboxyl anion is used, the peaks may deviate from the ranges.

The neutralization degree is obtained by the following expression (1).

$$\text{Neutralization degree } I=(d_a/(d_a+d_o)) \qquad (1)$$

In the absorption spectrum obtained by measuring the air-dried resin particles with an infrared spectrophotometer, the peak intensity of the C=O stretching vibration of the terminal carboxyl group is represented by $d_o$, and the peak intensity of the $CO_2^-$ antisymmetrical vibration of the carboxyl anion obtained by neutralizing the terminal carboxyl group is represented by $d_a$.

The infrared absorption peaks are described in R. M. Silverstein and F. X. Webster, Yuki Kagoubutsu no Spectrum niyoru Doutei (Identification of Organic Compounds with Spectra) (6th edition), published by Tokyo Kagaku Dozin Co., Ltd., and the presence of a diner through hydrogen bond should be considered in the case of carbonyl group and the like.

In the case where the peaks of $d_c$ and $d_a$ overlap peaks derived from other functional groups, the peak intensity is obtained in the following manner.

In the case where both ends of a peak $d_c$ or $d_a$, i.e., the entire peak of $d_c$ or $d_a$, overlap the other peak, the both ends are connected with a straight line to divide the peak. The upper part of the straight line is designated as a peak $d_c$ or $d_a$, and the lower part is designated as being derived from the other peak. The straight line connecting the both ends is drawn with consideration of the tangent line of the curve of the other peak.

In the case where only one end of a peak $d_c$ or $d_a$ overlaps the other peak, the tangent line of the peak curve of the other peak near the end where the peaks overlap each other is extended to an intersecting point with the base line. The upper part of the extended tangent line is designated as a peak $d_c$ or $d_a$, and the lower part is designated as being derived from the other peak.

The infrared spectrophotometer that can be used in the invention is not particularly limited and may be a known Fourier transformation infrared spectrophotometer (FT-IR). The measuring method and the preparation method of a specimen are not particularly limited, and the measurement is preferably effected by a KBr disk method.

The infrared spectrophotometer used for measuring the neutralization degree shown by the expression (1) may be FT/IR-410, produced by JASCO Corp. Upon measuring with this measuring equipment, the measurement may be effected in such a manner that about 40 mg of KBr powder and about 0.2 mg of a measuring specimen (concentration: 0.5%) are sufficiently pulverized and mixed in a mortar, and the mixture is molded under pressure and then subjected to the measurement.

The absorption spectrum referred herein is a transmission spectrum measured by the infrared spectrophotometer with respect to natural logarithm. In the measured transmission spectrum, it is preferred that a peak having a transmittance of 0.10 or less is preferably not present, and a peak having a transmittance of 0.15 or less is preferably not present. In the transmission spectrum and the absorption spectrum, known data correction, such as base line correction, may be effected as far as no problem occurs in the quantitative determination of the peaks.

The resin particle dispersion liquid of the invention without unevenness in particle size distribution or compositional maldistribution necessarily has a neutralization degree shown by the expression (1) of from approximately 0.30 to approximately 0.90, preferably from 0.4 to 0.8, and more preferably from 0.45 to 0.75.

In the case where the neutralization degree of the expression (1) is lower than the aforementioned range, the alkali equivalent is insufficient to the terminal carboxyl groups of the resin to lower the alkali neutralization degree of the terminal carboxyl groups of the resin, and as a result, the resin is hard to be dispersed in a dispersion medium, whereby the resin remains insoluble, a sufficient solid concentration (S.C.) cannot be obtained, and a dispersion liquid having a favorable median diameter (from 0.1 to 2.0 µm) without maldistribution of the composition cannot be obtained.

In the case where the neutralization degree of the expression (1) exceeds the aforementioned range, the alkali is excessive to the terminal carboxyl groups of the resin, and the neutralization proceeds excessively. Accordingly, a hydrophilic component is formed, and the resin may be dissolved in water in the case where the neutralization degree is further excessive, whereby emulsion cannot be formed, and the dispersed polyester particles form aggregated bodies under the excessive neutralization degree to separate into water and the polyester.

In the case of obtaining a resin particle dispersion liquid having a neutralization degree of the expression (1) of from 0.30 to 0.90, a surfactant, such as a nonionic surfactant and an anionic surfactant described later, may be added.

(Polycondensable Monomer)

The polycondensable monomer will be described.

The polycondensable monomer that can be used in the invention is a polycondensable monomer capable of forming polyester. Examples thereof include a polyvalent carboxylic acid, a polyol, a hydroxycarboxylic acid and a mixture thereof, and it is preferred to use at least a polyvalent carboxylic acid and a polyol. In particular, a polyvalent carboxylic acid and a polyol as the polycondensable monomers are preferably an ester compound thereof (an oligomer and/or a prepolymer), and those capable of providing polyester through direct ester reaction or ester exchange reaction are preferred. In this case, the polyester resin thus polymerized may be amorphous polyester (non-crystalline polyester), crystalline polyester or a mixture thereof.

The polyester that can be used in the invention is polyester having terminal carboxyl groups, and is preferably non-crystalline polyester.

The polyvalent carboxylic acid is a compound having two or more carboxyl groups in one molecule. A dicarboxylic acid among the polyvalent carboxylic acid is a compound having two carboxyl groups in one molecule, and examples thereof include oxalic acid, succinic acid, fumaric acid, maleic acid, adipic acid, β-methyladipic acid, malic acid, malonic acid, pimelic acid, tartaric acid, azelaic acid, pimelic acid, sebacic acid, nonanedicarboxylic acid, decanedicarboxylic acid, undecanedicarboxylic acid, dodecanedicarboxylic acid, citraconic acid, cyclohexane-3,5-diene-1,2-carboxylic acid, citric acid, hexahydroterephthalic acid, mucic acid, phthalic acid, isophthalic acid, terephthalic acid, tetrachlorophthalic acid, chlorophthalic acid, nitrophthalic acid, p-carboxyphenylacetic acid, p-phenylenedipropionic acid, m-phenylenedipropionic acid, m-phenylenediacetic acid, p-phenylenediacetic acid, o-phenylenediacetic acid, diphenyldiacetic acid, diphenyl-p,p'-dicarboxylic acid, 1,1-cyclopentenedicarboxylic acid, 1,4-cyclohexanedicarboxylic acid, 1,3-cyclohexanedicarboxylic acid, 1,2-cyclohexanedicarboxylic acid, 1,2-cyclohexanedicarboxylic acid, norbornene-2,3-dicarboxylic acid, 1,3-adamantanedicarboxylic acid, 1,3-adamantanediacetic acid, naphthalene-1,4-dicarboxylic acid, naphthalene-1,5-dicarboxylic acid, naphthalene-2,6-dicarboxylic acid and anthracenedicarboxylic acid.

Examples of the polyvalent carboxylic acid other than the dicarboxylic acid include trimellitic acid, pyromellitic acid, naphthalenetricarboxylic acid, naphthalenetetracarboxylic acid, pyrenetricarboxylic acid and pyrenetetracarboxylic acid.

The carboxylic acids may have a functional group other than a carboxyl group, and a carboxylic acid derivative, such as an acid anhydride and an acid ester, may also be used.

Preferred examples of the polyvalent carboxylic acids include sebacic acid, nonanedicarboxylic acid, decanedicarboxylic acid, undecanedicarboxylic acid, dodecanedicarboxylic acid, p-phenylenedipropionic acid, m-phenylenedipropionic acid, 1,4-cyclohexanedicarboxylic acid, 1,3-cyclohexanedicarboxylic acid, naphthalene-1,4-dicarboxylic acid, naphthalene-1,5-dicarboxylic acid, naphthalene-2,6-dicarboxylic acid, trimellitic acid and pyromellitic acid.

Examples of the polyvalent carboxylic acid other than the dicarboxylic acid include trimellitic acid, pyromellitic acid, naphthalenetricarboxylic acid, naphthalenetetracarboxylic acid, pyrenetricarboxylic acid and pyrenetetracarboxylic acid, and also include a lower ester of the polyvalent carboxylic acid and an acid chloride thereof.

These compounds may be used solely or in combination of two or more thereof.

The lower ester referred herein means that the carbon number of the alkoxy part of the ester is from 1 to 8. Specific examples thereof include a methyl ester, an ethyl ester, a n-propyl ester, an isopropyl ester, a n-butyl ester and an isobutyl ester.

The polyol is a compound having two or more hydroxyl groups in one molecule. The polyol is not particularly limited, and examples thereof include the following monomers.

Examples of a diol, which is a compound having two hydroxyl groups in one molecule, include propanediol, butanediol, pentanediol, hexanediol, heptanediol, octanediol, nonanediol, decanediol, dodecanediol, tetradecanediol and octadecanediol.

Examples of the polyol other than the diol include glycol, pentaerythritol, hexamethylolmelamine, hexaethylolmelamine, tetramethylolbenzoguanamine and tetraethylolbenzoguanamine.

Examples of the polyol having a cyclic structure include cyclohexanediol, cyclohexanedimethanol, bisphenol A, bisphenol C, bisphenol E, bisphenol F, bisphenol P, bisphenol S, bisphenol z, hydrogenated bisphenol, bisphenol, naphthalenediol, 1,3-adamantanediol, 1,3-adamantanedimethanol and 1,3-adamantanediethanol, but the invention is not limited to these examples.

In the invention, the aforementioned bisphenol compound preferably has at least one alkylene oxide group. Examples of the alkylene oxide group include an ethylene oxide group, a propylene oxide group and a butylene oxide group, but the invention is not limited thereto. Preferred examples thereof include an ethylene oxide group and a propylene oxide group, and the addition molar number thereof is preferably from 1 to 3. In the case where the addition molar number is in the range, the polyester produced can be properly controlled in viscoelasticity and glass transition temperature for using as a toner.

Preferred examples of the aforementioned monomers include hexanediol, cyclohexanediol, octanediol, decanediol, dodecanediol, and alkylene oxide adducts of bisphenol A, bisphenol C, bisphenol E, bisphenol S and bisphenol Z.

The polycondensable monomer may be used in combination of two or more kinds thereof at an arbitrary ratio. An on-crystalline resin and a crystalline resin can be easily obtained by the combinations of these polycondensable monomers.

For example, examples of the polyvalent carboxylic acid for obtaining crystalline polyester include oxalic acid, malonic acid, succinic acid, glutaric acid, adipic acid, pimelic acid, suberic acid, azelaic acid, sebacic acid, maleic acid, fumaric acid, citraconic acid, itaconic acid, glutaconic acid, n-dodecylsuccinic acid, n-dodecenylsuccinic acid, isododecylsuccinic acid, isododecenylsuccinic acid, n-octylsuccinic acid, n-octenylsuccinic acid, an acid anhydride thereof, and a lower ester thereof, and also include an acid chloride thereof.

Examples of the polyol for obtaining crystalline polyester include ethylene glycol, diethylene glycol, triethylene glycol, 1,2-propanediol, 1,3-propanediol, 1,4-butanediol, 1,4-butenediol, neopentyl glycol, 1,5-pentanediol, 1,6-hexanediol, 1,4-cyclohexanediol, 1,4-cyclohexanedimethanol, dipropylene glycol, polyethylene glycol, polypropylene glycol, polytetramethylene glycol, bisphenol A, bisphenol Z and hydrogenated bisphenol A.

Examples of the polyvalent carboxylic acid for obtaining non-crystalline polyester include an aromatic dicarboxylic acid, such as phthalic acid, isophthalic acid, terephthalic acid, naphthalene-2,6-dicarboxylic acid, malonic acid and mesaconic acid, and a lower alkyl ester thereof. Examples of the trivalent or higher carboxylic acid include 1,2,4-benzenetricarboxylic acid, 1,3,5-benzenetricarboxylic acid, 1,2,4-naphthalenetricarboxylic acid, acid anhydrides of these acids, sodium 2-sulfoterephthalate, sodium 5-sulfo isophthalate, sodium sulfosuccinate, and lower esters of thereof, but the invention is not limited to these examples.

Examples of the crystalline polyester include polyester obtained by reacting 1,9-nonanediol with 1,10-decanedicarboxylic acid, or reacting cyclohexanediol with adipic acid, polyester obtained by reacting 1,6-hexanediol with sebacic acid, polyester obtained by reacting ethylene glycol with succinic acid, polyester obtained by reacting ethylene glycol with sebacic acid, and polyester obtained by reacting 1,4-butanediol with succinic acid. Among these, polyester include polyester obtained by reacting 1,9-nonanediol with 1,10-decanedicarboxylic acid, and polyester obtained by reacting 1,6-hexanediol with sebacic acid are particularly preferred, but the invention is not limited to these examples.

The crystalline resin preferably has a crystalline melting temperature Tm of from 50 to 120° C., and more preferably from 55 to 90° C. In the case where Tm is 50° C. or more, it is preferred since the binder resin has good cohesion power at a high temperature, and good releasing property and good hot offset property can be obtained upon fixing. In the case where Tm is 120° C. or less, it is preferred since sufficient melting can be obtained to prevent the minimum fixing temperature from being increased.

In the case where the polycondensed resin particles are non-crystalline, the glass transition temperature Tg is preferably from 50 to 80° C., and more preferably from 50 to 65° C. In the case where Tg is 50° C. or more, it is preferred since the binder resin has good cohesion power at a high temperature, and good releasing property and good hot offset property can be obtained upon fixing. In the case where Tg is 80° C. or less, it is preferred since sufficient melting can be obtained to prevent the minimum fixing temperature from being increased.

The melting temperature of the crystalline resin is measured by using a differential scanning calorimeter (DSC) and can be obtained as a melting peak temperature of input compensation differential scanning calorimetric measurement shown in JIS K7121 (1987) upon measuring at a temperature increasing rate of 10° C. per minute from room temperature to 150° C. There are cases where a crystalline resin shows plural melting peaks, and in this case, the maximum peak is designated as the melting temperature in the invention.

The glass transition temperature of the non-crystalline resin is a value measured according to the method described in ASTM D3418-82 (DSC method).

The term "crystalline" as in the crystalline polyester resin referred herein means that in the differential scanning calorimetric (DSC) measurement, the resin has a distinct endothermic peak but not stepwise endothermic change, and more specifically it means that the half value width of the endothermic peak measured at a temperature increasing rate of 10° C. per minutes is 6° C. or less.

On the other hand, a resin having a half value width of the endothermic peak exceeding 6° C. and a resin having no distinct endothermic peak are designated as non-crystalline (amorphous) resins.

Examples of the polyvalent alcohol for obtaining non-crystalline polyester include aliphatic, alicyclic and aromatic polyvalent alcohols, and more specifically, preferred examples thereof include 1,5-pentanediol, 1,6-hexanediol, 1,4-cyclohexanediol, 1,4-cyclohexanedimethanol, dipropylene glycol, polyethylene glycol, polypropylene glycol, polytetramethylene glycol, bisphenol A, bisphenol Z and hydrogenated bisphenol A, but the invention is not limited thereto.

The polycondensation may be effected by using a hydroxycarboxylic acid compound having a carboxyl group and a hydroxyl group in one molecule. Specific examples thereof include hydroxyoctanoic acid, hydroxynonanoic acid, hydroxydecanoic acid, hydroxyundecanoic acid, hydroxydodecanoic acid, hydroxytetradecanoic acid, hydroxytridecanoic acid, hydroxyhexadecanoic acid, hydroxypentadecanoic acid and hydroxystearic acid, but the invention is not limited thereto.

The weight average molecular weight of the polyester obtained by polycondensation of the polycondensable monomers is preferably from 1,500 to 55,000, and more preferably from 3,000 to 45,000. In the case where the weight average molecular weight is 1,500 or more, the binder resin is good in cohesion power and excellent in hot off set property, and in the case where the weight average molecular weight is 55,000 or less, it is preferred since the resin is excellent in hot offset property and has an excellent minimum fixing temperature. The resin may have partially a branched structure and a crosslinked structure through selection of the carboxylic acid valency and the alcohol valency of the monomers.

The median diameter (center diameter) of the resin particles of the resin particle dispersion liquid of the invention is from 0.1 to 2.0 μm, preferably from 0.1 to 1.0 μm, and more preferably from 0.15 to 0.8 μm. In the case where the median diameter is in the range, the dispersion state of the resin particles in an aqueous medium is stabilized as having been described. Accordingly, in the case where the median diameter is 0.1 μm or more upon producing a toner, it is preferred since the cohesion property upon forming particles is good to prevent free resin particles from being formed, and the viscosity of the system is prevented from being increased, whereby the particle diameter can be easily controlled. In the case where the median diameter is 2.0 μm or less, it is preferred since coarse particles may not formed, a good particle size distribution is obtained, and a releasing agent, such as wax, is prevented from being released, whereby good releasing property and offset property can be obtained upon fixing.

The median diameter of the resin particles can be measured with a laser diffraction particle size distribution measuring device (LA-920, produced by Horiba, Ltd.).

In addition to the median diameter, the resin particle dispersion liquid of the invention is preferably free of formation of fine powder and coarse powder, and the ratio of the polycondensation resin particles having a median diameter of 0.03 µm or less or 5.0 µm or more is preferably 10% or less, and more preferably 5% or less. The ratio can be obtained, for example, by plotting the particle diameter and the frequency in the measurement result of LA-920, and calculating the accumulated frequency of 0.03 µm or less and 5.0 µm or more.

In the case where the resin particle dispersion of the invention is sampled in a small amount to a test tube (for example, a 50-mL polypropylene centrifuging tube (30 mm in diameter and 118 mm in height)) and subjected to centrifugal separation at 2,000 rpm for 10 minutes, and samples are obtained from the supernatant liquid and the bottom part of the test tube, which are subjected to measurement of particle diameter, the median diameter of the supernatant liquid and the median diameter of the bottom part ((median diameter of supernatant)/(median diameter of bottom part)) is preferably 0.80 to 1, and more preferably 0.90 to 1.

Preferred examples of a centrifugal machine used for the centrifugal separation include Hitachi Compact Desktop Centrifugal Machine (Himac CT4i, produced by Hitachi High-Technologies Corp.).

The dispersion medium of the resin particle dispersion liquid of the invention is an aqueous medium.

Examples of the aqueous medium that can be used in the invention include water, such as distilled water and ion exchanged water, and an alcohol, such as methanol and ethanol. Among these, ethanol and water are preferred, and water, such as distilled water and ion exchanged water, is particularly preferred. These may be used solely or in combination of two or more kinds thereof.

The aqueous medium may contain a water miscible organic solvent. Examples of the water miscible organic solvent include acetone and acetic acid.

The solid content in the aqueous medium of the resin particle dispersion liquid of the invention is preferably from 5 to 50 parts by weight, more preferably from 10 to 40 parts by weight, further preferably from 10 to 30 parts by weight, and most preferably from 15 to 25 parts by weight. In the case where the solid content is 50 parts by weight or less, it is preferred since the latex is good in flowability and is not changed into a form depending on the storing condition. In the case where the solid content is 5 parts by weight or more, it is preferred since upon producing a toner by using the dispersion liquid of the invention, the proportion of the dispersion liquid occupied in the entire formulation is not large, whereby the formulation can be easily control-led, and the cost for transportation can be suppressed.

Upon polymerization in the aqueous medium, a colorant, wax and the like described later may be mixed in addition to the aforementioned monomer components before polymerization. According to the procedure, resin particles having a colorant and wax incorporated therein can be obtained.

Upon dispersing the polyester in the aqueous medium, the materials described above are dispersed in the aqueous medium by using, for example, a mechanical shearing force or ultrasonic vibration, and in the dispersing operation, a surfactant, a polymer dispersant and an inorganic dispersant may be added to the aqueous medium. It is also possible that the aqueous medium is added to a mixture (oily phase) containing the polyester, and the polyester is finally emulsified in the aqueous medium.

The resin particle dispersion liquid of the invention may contain a surfactant described later for improving the dispersion efficiency and the stability of the resin particle dispersion liquid.

Examples of the surfactant that can be used in the invention include an anionic surfactant, such as a sulfate ester series, a sulfonate salt series and a phosphate ester series; a cationic surfactant, such as amine salt series and a quaternary ammonium salt series; and a nonionic surfactant, such as a polyethylene glycol series, an alkylphenol ethylene oxide adduct series and a polyvalent alcohol series. Among these, an anionic surfactant and a cationic surfactant are preferably used. The nonionic surfactant is preferably used in combination with the anionic surfactant or the cationic surfactant. The surfactants may be used solely or in combination of two or more kinds thereof.

Examples of the anionic surfactant include sodium dodecylbenzenesulfonate, sodium alkylnaphthalenesulfonate, sodium arylalkylpolyethersulfonate, sodium 3,3-disulfone-diphenylurea-4,4-diazo-bis-amino-8-naphthol-6-sulfonate, o-carboxybenzene-azo-dimethylanyline, sodium 2,2,5,5-tetramethyl-triphenylmethane-4,4-diazo-bis-α-naphthol-6-sulfonate, sodium dialkylsulfosuccinate, sodium dodecylsulfate, sodium tetradecylsulfate, sodium pentadecylsulfate, sodium octylsulfate, sodiumoleate, sodium laurate, sodium caprate, sodium caprylate, sodium caproate, sodium stearate and calcium oleate.

Examples of the cationic surfactant include alkylbenzene dimethylammonium chloride, alkyltrimethylammonium chloride and distearylammonium chloride.

Examples of the nonionic surfactant include polyethyleneoxide, polypropylene oxide, a combination of polypropylene oxide and polyethylene oxide, an ester of polyethylene glycol and a higher fatty acid, alkylphenolpolyethylene oxide, an ester of a higher fatty acid and polyethylene glycol, an ester of a higher fatty acid and polypropylene oxide, and sorbitan ester.

The resin particle dispersion liquid of the invention may contain a polymer dispersant and a stabilizing assistant.

Examples of the polymer dispersant include sodium polycarboxylate and polyvinyl alcohol, and examples of the inorganic dispersant include calcium carbonate, but the invention is not limited thereto.

In order to prevent the Ostwald Ripnin phenomenon of monomer emulsion particles in an aqueous medium from occurring, a higher alcohol, such as heptanol and octanol, a higher aliphatic hydrocarbon, such as hexadecane, may be added as a stabilizing assistant.

In the invention, an addition-polymerizable monomer, preferably a radical-polymerizable monomer, may be added depending on necessity, in addition to the polycondensable monomers, whereby polycondensation and addition polymerization may be simultaneously or separately carried out to obtain composite particles. Examples of the addition-polymerizable monomer include a cation-polymerizable monomer and a radical-polymerizable monomer, and preferably a radical-polymerizable monomer.

Examples of the radical-polymerizable monomer used herein include a vinyl aromatic compound, such as styrene, an α-substituted styrene, e.g., α-methyl styrene and α-ethylstyrene, a nucleus substituted styrene, e.g., m-methylstyrene, p-methylstyrene and 2,5-dimethylstyrene, a nucleus substituted halogenated styrene, e.g., p-chlorostyrene, p-bromostyrene and dibromostyrene, an unsaturated carboxylic acid, such as (meth) acrylic acid (hereinafter, the term "(meth) acrylic" means both acrylic and methacrylic), crotonic acid, maleic acid, fumaric acid, citraconic acid and itaconic acid, an unsaturated carboxylate ester, such as methyl (meth) acrylate, ethyl(meth) acrylate, propyl(meth) acrylate, butyl (meth)acrylate, pentyl(meth)acrylate, hexyl(meth)acrylate, 2-ethylhexyl(meth)acrylate, glycidyl(meth)acrylate and benzyl (meth)acrylate, an unsaturated carboxylic acid derivative, such as (meth) acrylaldehyde, (meth) acrylonitrile and (meth) acrylamide, an N-vinyl compound, such as N-vinyl pyridine and N-vinylpyrrolidone, a vinyl ester compound, such as vinyl formate, vinyl acetate and vinyl propionate, a halogenated vinyl compound, such as vinyl chloride, vinyl bromide and vinylidene chloride, an N-substituted unsaturated amide, such as N-methylolacrylamide, N-ethylolacrylamide, N-propanolacrylamide, N-methylolmaleinamide acid, N-methylolmaleinamide acid ester, N-methylolmaleimide and N-ethylolmaleimide, a conjugated diene, such as butadiene and isoprene, a polyfunctional vinyl compound, such as divinylbenzene, divinylnaphthalene and divinylcyclohexane, and a polyfunctional acrylate compound, such as ethylene glycol (meth)acrylate, diethylene glycol (meth) acrylate, propylene glycol (meth) acrylate, tetramethylene glycol (meth)acrylate, neopentyl glycol (meth)acrylate, hexamethylene glycol (meth)acrylate, trimethylolpropane di(meth)acrylate, trimethylolpropane tri(meth) acrylate, glycerol di(meth)acrylate, glycerol tri(meth)acrylate, pentaerythritol di(meth)acrylate, pentaerythritol tri(meth)acrylate, pentaerythritol tetra(meth) acrylate, dipentaerythritol di(meth)acrylate, dipentaerythritol tri(meth)acrylate, dipentaerythritol tetra(meth)acrylate, dipentaerythritol penta(meth)acrylate, dipentaerythritolhexa (meth)acrylate, sorbitol tri(meth) acrylate, sorbitol tetra (meth)acrylate, sorbitol penta(meth)acrylate and sorbitol hexa(meth)acrylate. Among these, an N-substituted unsaturated amide compound, a conjugated diene, a polyfunctional vinyl compound and a polyfunctional acrylate compound can cause crosslinking reaction in the polymer thus produced. These may be used solely or in combination thereof.

The addition-polymerizable monomer, particularly the radical-polymerizable monomer, may be subjected to a known polymerization method, such as a method using a radical polymerization initiator, a self-polymerization method under heat, and a method using irradiation of ultraviolet ray. In the method using a radical polymerization initiator, both an oil soluble radical initiator and a water soluble radical initiator may be used.

Specific examples of the initiator include an azobisnitrile compound, such as 2,2'-azobis(2-methylpropyonitrile), 2,2'-azobis(2-methylbutylonitrile), 2,2'-azobisisobutylonitrile, 2,2'-azobis(2,4-dimethylvaleronitrile), 2,2'-azobis(2,4-dimethyl-4-methoxyvaleronitrile), 1,1'-azobis(cyclohexanecarbonitrile) and 2,2'-azobis(2-amidinopropane) hydrochloride, an organic peroxy compound, for example, a diacyl peroxide compound, such as acetyl peroxide, octanoyl peroxide, 3,5,5-trimethylhexanoyl peroxide, decanoyl peroxide, lauroyl peroxide and benzoyl peroxide, a dialkyl peroxide compound, such as di-tert-butyl peroxide, tert-butyl-α-cumyl peroxide and dicumyl peroxide, a peroxy ester compound, such as tert-butyl peroxy acetate, α-cumyl peroxypivalate, tert-butyl peroxy octoate, tert-butyl peroxy neodecanoate, tert-butyl peroxy laurate, tert-butyl peroxy benzoate, di-tert-butyl peroxy phthalate and di-tert-butyl peroxy isophthalate, and a hydroperoxide compound, such as tert-butyl hydroperoxide, 2,5-dimethylhexane-2,5-dihydroperoxide, cumene hydroperoxide, diisopropylbenzene hydroperoxide, and a peroxy carbonate compound, such as tert-butyl peroxy isopropyl carbonate, an inorganic peroxide compound, such as hydrogen peroxide, and a persulfate salt compound, such as potassium persulfate, sodium persulfate and ammonium persulfate. A redox polymerization initiator may be used in combination.

A chain transfer agent may be used upon addition polymerization. The chain transfer agent is not particularly limited, and is preferably a compound having a covalent bond between a carbon atom and a sulfur atom, examples of which include a thiol compound.

In the invention, a co-surfactant may be used in combination in order to maintain the average particle diameter of the polyester-containing material (oily phase) containing the aforementioned addition-polymerizable monomer to a specific range. As the co-surfactant, such a compound may be used that is insoluble or difficulty soluble in water and soluble in the monomer and is used in the known mini-emulsion polymerization described in detail later.

Preferred examples of the co-surfactant include an alkane having from 8 to 30 carbon atoms, such as dodecane, hexadecane and octadecane, an alkyl alcohol having from 8 to 30 carbon atoms, such as lauryl alcohol, cetyl alcohol and stearyl alcohol, an alkyl (meth)acrylate having from 8 to 30 carbon atoms, such as lauryl (meth)acrylate, cetyl(meth)acrylate and stearyl(meth)acrylate, and an alkylmercaptan having from % to 30 carbon atoms, such as lauryl mercaptan, cetyl mercaptan and stearyl mercaptan, and also include a polymer or polyadduct, such as polystyrene and polymethyl methacrylate, a carboxylic acid compound, a ketone compound and an amine compound.

(Production Method of Resin Particle Dispersion Liquid)

The resin particle dispersion liquid of the invention is preferably produced by the production method described below.

The production method of the resin particle dispersion liquid of the invention is preferably a method containing a step of polycondensing a polycondensable monomer to obtain polyester having an acid value of approximately 1 mg·KOH/g or more and less than approximately 15 mg·KOH/g (hereinafter, referred to as a polycondensing step), a step of dispersing the polyester and a divalent or higher organic acid in an aqueous medium (hereinafter, referred to as a dispersing step), and a step of partially neutralizing terminal carboxyl groups of the polyester (hereinafter, referred to as a neutralizing step).

The production method of the resin particle dispersion liquid of the invention may further contain other steps described later and known steps depending on necessity.

(Polycondensing Step)

The production method of the resin particle dispersion liquid of the invention preferably contains a step of polycondensing a polycondensable monomer to obtain polyester having an acid value of approximately 1 mg·KOH/g or more and less than approximately 15 mg·KOH/g and having terminal carboxyl groups.

The reaction temperature of the polycondensation reaction in the polycondensing step is preferably lower than the related-art reaction temperature. The reaction temperature is preferably from 70 to 150° C., more preferably from 70 to 140° C., and further preferably from 80 to 140° C. In the case where the reaction temperature is 70° C. or more, it is preferred since the solubility of the monomer and the catalyst activity are not lowered, the reactivity is sufficiently high, and the extension of the molecular weight is not suppressed. In the case where the reaction temperature is 150° C. or less, it is preferred since a low energy production method can be attained. Furthermore, it is also preferred since coloration of the resin due to a high temperature, and decomposition of the polyester thus formed can be prevented from occurring.

The reaction time of the polycondensation reaction is preferably from 0.5 to 72 hours, and more preferably from 1 to 48 hours, while it depends on the reaction temperature.

The polycondensation reaction in the polycondensing step of the invention may be carried out an ordinary polycondensation method, such as bulk polymerization, emulsion polymerization, in-water polymerization, e.g., suspension polymerization, solution polymerization and interface polymerization, and bulk polymerization and in-water polymerization are preferably employed. The reaction may be carried out under the atmospheric pressure, but in the case where the molecular weight of the polyester is to be increased, ordinarily employed conditions, such as reduced pressure and nitrogen stream, may be widely employed.

(Polycondensation Catalyst)

In the polycondensing step in the invention, a polycondensation catalyst is preferably used for increasing the reaction rate of the polycondensation reaction.

In the polycondensing step, a known polycondensation catalyst may be contained in the polycondensable monomer in advance depending on necessity. In order to polycondense the polycondensable monomer at a low temperature of 150° C. or less, or 100° C. or less, a polycondensation catalyst is generally used. As a polycondensation catalyst that has catalytic activity at a low temperature, an acid catalyst, a rare earth-containing catalyst or a hydrolysis enzyme may be used, and among these, an acid catalyst is preferably used with a sulfur acid being more preferred.

As the acid catalyst, those exhibiting acidity, such as a Bronsted acid, are preferred, which include salt compounds thereof. Among Bronsted acids, a sulfur acid is more preferably used.

Furthermore, an acid having a surface active effect may also be used. The acid having a surface active effect has a chemical structure containing a hydrophobic group and a hydrophilic group, and at least a part of the hydrophilic group has an acid structure containing a proton.

Examples of the sulfur acid include an inorganic sulfur acid and an organic sulfur acid. Examples of the inorganic sulfur acid include sulfuric acid, sulfurous acid and salts thereof. Examples of the organic sulfur acid include a sulfonic acid compound, such as alkylsulfonic acid, arylsulfonic acid and salts thereof, and an organic sulfuric acid compound, such as alkylsulfuric acid, arylsulfuric acid and salts thereof.

The sulfur acid is preferably an organic sulfur acid, and an organic sulfur acid having a surface active effect is more preferably used.

Examples of the organic sulfur acid having a surface active effect include alkylbenzenesulfonic acid, alkylsulfonic acid, alkyldisulfonic acid, alkylphenolsulfonic acid, alkylnaphthalenesulfonic acid, alkyltetralinsulfonic acid, alkylarylsulfonic acid, petroleum sulfonic acid, alkylbenzoimidazolesulfonic acid, higher alcohol ether sulfonic acid, alkyldiphenylsulfonic acid, long-chain alkylsulfonic acid, higher alcohol sulfate ester, higher alcohol ether sulfate ester, higher fatty acid amidealkylol sulfate ester, higher fatty acid amidealkyl sulfate ester, sulfated fat, sulfosuccinate ester, resin acid alcohol sulfuric acid, and salt compounds of these acids, which may be used in combination depending on necessity. Among these, sulfonic acid having an alkyl group or an aralkyl group, sulfate ester having an alkyl group or an aralkyl group, and salt compounds thereof are preferred, and the carbon number of the alkyl group or the aralkyl group is more preferably from 7 to 20. Specific examples thereof include dodecylbenzenesulfonic acid, isopropylbenzenesulfonic acid, camphorsulfonic acid, p-toluenesulfonic acid, monobutylphenylphenolsulfonic acid, dibutylphenylphenolsulfonic acid, dodecylsulfuric acid and naphthenylalcoholsulfuric acid.

Other examples of the acid having a surface active effect include a fatty acid, a sulfonated higher fatty acid, higher alkylphosphate ester, resin acid, naphtenoic acid, and salt compounds of these compounds.

Effective examples of the rare earth-containing catalyst include those containing scandium (Sc), yttrium (Y), and a lanthanide, such as lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu), and in particular, an alkylbenzenesulfonate salt, an alkylsulfate ester and a compound having a triflate structure are effective.

As the rare earth-containing catalyst, those having a triflate structure, such as scandium triflate, yttrium triflate and lanthanide triflate, are preferred. Lanthanide triflate is described in detail in J. of Synth. Org. Chem., Japan, vol. 53, No. 5, pp. 44-54. Examples of the triflate include compounds represented by $X(OSO_2CF_3)_3$, wherein X represents a rare earth element, and among these, X is more preferably scandium (Sc), yttrium (Y), ytterbium (Yb) and samarium (Sm).

The hydrolysis enzyme is not particularly limited as far as it catalyzes ester synthesis reaction. Examples of the hydrolysis enzyme include esterase classified into EC (enzyme number) group 3.1 (as described in Maruo and Tamiya, Koso Handbook (Enzyme Handbook), published by Asakura Publishing Co., Ltd.), such as carboxyesterase, lipase, phospholipase, acetylesterase, pectinesterase, cholesterolesterase, tannase, monoacylglycerollipase, lactonase and lipoproteinlipase, a hydrolysis enzyme classified into EC group 3.2 that acts on a glycosyl compound, such as glucosidase, galactosidase, glucuronidase and xylodase, a hydrolysis enzyme classified into EC group 3.3, such as epoxyhydrase, a hydrolysis enzyme classified into EC group 3.4 that acts on a peptide bond, such as aminopeptidase, chymotrypsin, trypsin, plasmin and subtilisin, and a hydrolysis enzyme classified into EC group 3.7, such as phloretinhydorase.

Among these esterases, an enzyme that hydrolyzes glycerol ester to liberate a fatty acid is referred to as lipase, and libase has such advantages that it has high stability in an organic solvent, can catalyze ester synthesis reaction with high yield, and is available inexpensively. Accordingly, lipase is preferably used in the production method of the polyester of the invention from the standpoint of yield and cost.

The lipase is not limited in origin thereof, and preferred examples thereof include lipase derived from a microorganism, such as genus *Pseudomonas*, genus *Alcaligenes*, genus *Achromobacter*, genus *Candida*, genus *Aspergillus*, genus *Rhizopus* and genus *Mucor*, and also pancreatin and steapsin. Among these, lipase derived from a microorganism of genus *Pseudomonas*, genus *Candida* or genus *Aspergillus* is preferably used.

The polycondensation catalysts may be used solely or in combination of plural kinds thereof. The catalyst may be recovered and reused depending on necessity.

(Aqueous Medium)

The polycondensation reaction in the polycondensing step may be carried out with an aqueous medium.

The aqueous medium that can be used for the polycondensation reaction may be the same as the aqueous medium having been described above, and the preferred range thereof is also the same as above.

(Organic Solvent)

The polycondensation reaction in the polycondensing step may be carried out with an organic solvent.

Specific examples of the organic solvent that can be used in the invention include a hydrocarbon solvent, such as toluene, xylene and mesitylene, a halogen solvent, such as chlorobenzene, bromobenzene, iodobenzene, dichlorobenzene, 1,1,2,2-tetrachloroethane and p-chlorotoluene, a ketone solvent, such as 3-hexanone, acetophenone and benzophenone, an ether solvent, such as dibutyl ether, anisole, phenetol, o-dimethoxybenzene, p-dimethoxybenzene, 3-methoxytoluene, dibenzyl ether, benzyl phenyl ether, methoxynaphthalene and tetrahydrofuran, a thioether solvent, such as phenylsulfide and thioanisole, an ester solvent, such as ethyl acetate, butyl acetate, pentyl acetate, methyl benzoate, methyl phthalate, ethyl phthalate and cellosolve acetate, and diphenyl ether solvent, such as diphenyl ether and an alkyl-substituted diphenyl ether, e.g., 4-methylphenyl ether, 3-methylphenyl ether and 3-phenoxytoluene, a halogen-substituted diphenyl ether, e.g., 4-bromophenyl ether, 4-chlorophenyl ether, 4-bromodiphenyl ether and 4-methyl-4'-bromodiphenyl ether, an alkoxy-substituted diphenyl ether, e.g., 4-methoxydiphenyl ether, 4-methoxyphenyl ether, 3-methoxyphenyl ether and 4-methyl-4'-methoxydiphenyl ether, and a cyclic diphenyl ether, e.g., dibenzofuran and xanthone, which may be used as a mixture. The solvent is preferably those that can be easily separated from water. In order to obtain polyester having a large average molecular weight, an ester solvent, an ether solvent and a diphenyl ether solvent are preferred, and an alkyl aryl ether solvent and an ester solvent are particularly preferred.

In order to obtain a binder resin having a large average molecular weight in the invention, a dehydrating agent and a demonomerizing may be added to the organic solvent. Specific examples of the dehydrating agent and the demonomerizing agent include molecular sieve, such as molecular sieve 3A, molecular sieve 4A, molecular sieve 5A and molecular sieve 13X, alumina, silica gel, calcium chloride, calcium sulfate, diphosphorous tetraoxide, concentrated sulfuric acid, magnesium perchlorate, barium oxide, calcium oxide, potassium hydroxide, sodium hydroxide, a metallic hydride, such as calcium hydride, sodium hydride and lithium aluminum hydride, and an alkali metal, such as sodium. Among these, molecular sieve is preferred from the standpoint of easiness in handling and regeneration.

(Dispersing Step)

The production method of the resin particle dispersion liquid of the invention preferably contains a step of dispersing the polyester and a divalent or higher organic acid in an aqueous medium.

The dispersing step is preferably carried out by adding a surfactant for improving the dispersion efficiency and stability of the resin particle dispersion liquid.

In the dispersing step, the divalent or higher organic acid may be added immediately before completing the polycondensation or after completing the polycondensation, whereby the acid is partially polycondensed with the resin or partially crosslinked therewith, or may be dissolved in the aqueous medium used for emulsification, followed by dispersing the polyester. The divalent of higher acid is preferably added to the aqueous medium since the surface active function can be highly exhibited. Furthermore, such a method is also more preferred that the polyester and the divalent or higher acid are mixed after completing the polycondensation and are added to the aqueous medium for dispersing.

In the dispersing step, it is preferred to add a monocarboxylic acid having 4 or more carbon atoms and/or a salt thereof.

Examples of the method for dispersing and the polyester in the aqueous medium to form particles include known methods, such as a forced emulsification method, a self-emulsification method and a phase inversion emulsification method. Among these, a self-emulsification method and a phase inversion emulsification method are preferably employed from the standpoint of energy necessary for emulsification, and controllability in particle diameter and stability of the resulting emulsion.

The self-emulsification method and the phase inversion emulsification method are described in Cho-biryushi Polymer no Ouyou Gijutsu (Application Techniques of Ultrafine Polymer Particles), published by CMC Press. The self-emulsification method is more preferably employed since the polyester has terminal carboxyl groups, which are partially neutralized.

(Neutralizing Step)

The production process of the resin particle dispersion liquid of the invention preferably contains a step of partially neutralizing terminal carboxyl groups of the polyester.

Upon neutralizing the terminal carboxyl groups, the aforementioned neutralizing agents are preferably used.

The neutralizing step in the invention may be carried out simultaneously with the dispersing step or before or after the dispersing step.

The neutralizing method in the neutralizing step is not particularly limited as far as the aforementioned neutralization degree, and examples thereof include a method of dispersing a neutralizing agent in the aqueous medium to effect neutralization, a method of neutralizing the polyester with a neutralizing agent without a solvent or in a solvent, and a method of adding a neutralizing agent to the dispersion liquid of the polyester to effect neutralization.

(Toner for Developing Electrostatic Image and Production Method of Toner)

The production method of a toner for developing an electrostatic image (hereinafter, referred simply to a toner) of the invention contains at least a step of aggregating resin particles in a dispersion liquid containing a resin particle dispersion liquid to obtain aggregated particles, and a step of fusing the aggregated particles under heating, in which the resin particle dispersion liquid is the resin particle dispersion liquid of the invention.

In the production method of a toner for developing an electrostatic image of the invention, for example, the resin particle dispersion liquid prepared according to the invention is mixed with a colorant particle dispersion liquid and a releasing agent particle dispersion liquid, to which an aggregating agent is added to form aggregated particles having a toner diameter through hetero-aggregation, and then the aggregated particles are heated to a temperature higher than the glass transition temperature or the melting temperature of the resin particles to fuse and integrate the aggregated particles, followed by washing and drying, whereby the toner for developing an electrostatic image of the invention can be obtained. The shape of the toner is preferably from an irregular shape to a spherical shape. Preferred examples of the aggregating agent include a surfactant, an inorganic salt and a divalent or higher metallic salt. A metallic salt is particularly preferably used from the standpoint of control of aggregation property and charging property of the toner.

It is also possible in the aggregating step that the resin particle dispersion liquid of the invention and a colorant particle dispersion liquid are aggregated in advance to form first aggregated particles, and then the resin particle dispersion liquid or another resin particle dispersion liquid is added thereto to form a second shell layer on the surface of the first particles. In this example, the colorant particle dispersion liquid may be separately prepared, or in alternative, a colorant may be added in advance to the resin particles of the resin particle dispersion liquid of the invention.

The formation method of the aggregated particles in the invention is not particularly limited, and known aggregating method used in the related-art emulsion polymerization aggregation method for a toner for developing an electrostatic image, may be employed, for example, the stability of the emulsion is decreased by increasing the temperature, changing the pH or adding a salt, followed by agitating with a disperser.

Furthermore, after completing the aggregating step, the surface of the particles may be crosslinked by applying a heat treatment or the like for suppressing the colorant from being oozed from the surface of the particles. The surfactant used may be removed by washing with water, an acid or an alkali depending on necessity.

In the production method of the toner for developing an electrostatic image of the invention, a charge controlling agent that is ordinarily used in toners of this kind may be used depending on necessity, and in this case, the charge controlling agent may be added as an aqueous dispersion liquid at the time when production of the monomer particle emulsion is started, the polymerization is started, or aggregation of the resin particles is started.

The addition amount of the charge controlling agent is preferably from 1 to 25 parts by weight, and more preferably from 5 to 15 parts by weight, per 100 parts by weight of the monomer or the polymer.

The charge controlling agent may be known charge controlling agents, examples of which include a positive charge controlling agent, such as a nigrosine dye, a quaternary ammonium salt compound, a triphenylmethane compound, an imidazole compound and a polyamine resin, and a negative charge controlling agent, such as a metal-containing azo dye, e.g., chromium, cobalt, aluminum or iron, a metallic salt or a metallic complex of chromium, zinc, aluminum or the like of a hydroxycarboxylic acid, e.g., salicylic acid, alkylsalicylic acid or benzilic acid, an amide compound, a phenol compound, a naphthol compound and a phenolamide compound.

In the production method of the toner for developing an electrostatic image of the invention, various kinds of wax that is ordinarily used as a releasing agent in toners of this kind may be used depending on necessity, and in this case, the releasing agent may be added as an aqueous dispersion liquid at the time when production of the monomer particle emulsion is started, the polymerization is started, or aggregation of the resin particles is started. The addition amount of the releasing agent is preferably from 1 to 25 parts by weight, and more preferably from 5 to 15 parts by weight, per 100 parts by weight of the monomer or the polymer.

The releasing agent may be known ones, examples of which include polyolefin wax, such as low molecular weight polyethylene, low molecular weight polypropylene and an ethylene-propylene copolymer, paraffin wax, vegetable wax, such as hydrogenated caster oil, carnauba wax and rice wax, higher fatty acid ester wax, such as a stearate ester, a behenate ester and a montanate ester, alkyl-modified silicone, a higher fatty acid, such as stearic acid, a higher alcohol, such as stearyl alcohol, a higher fatty acid amide, such as oleic amide and stearic amide, and a ketone having a long-chain alkyl group, such as distearyl ketone.

In the production method of the toner for developing an electrostatic image of the invention, furthermore, known internal additives, such as an antioxidant and an ultraviolet ray absorbent, that are ordinarily used as a releasing agent in toners of this kind may be used depending on necessity.

The toner obtained by the production method of the toner for developing an electrostatic image of the invention preferably has an average particle diameter of from 1 to 10 μm, and preferably contains, in the particles thereof, a colorant in an amount of from 0.1 to 50 parts by weight, more preferably from 0.5 to 40 parts by weight, and particularly preferably from 1 to 25 parts by weight, per 100 parts by weight of the polyester.

(Addition Polymerization Resin Particle Dispersion Liquid)

In addition to the crystalline polyester resin particle dispersion liquid and the non-crystalline polyester resin particle dispersion liquid, an addition polymerization resin particle dispersion liquid that is produced by known emulsion polymerization or the like may be used in combination. The addition polymerization resin particle dispersion liquid that can be used in the invention preferably has a median diameter of the resin particles of from 0.1 to 2.0 μm as similar to the resin particle dispersion liquid of the invention.

Examples of an addition-polymerizable for producing the addition polymerization resin particle dispersion liquid include the addition-polymerizable monomers having been described above.

The addition-polymerizable monomer can be subjected to emulsion polymerization by using an ionic surfactant or the like to produce a resin particle dispersion liquid, and in the case of other resins, an oily monomer that can be dissolved in a solvent having a relatively low solubility in water may be dissolved in the solvent and dispersed into particles in an aqueous medium along with an ionic surfactant or a polymer electrolyte with a dispersing device, such as a homogenizer, and then the solvent is evaporated by heating or reducing pressure to obtain the resin particle dispersion liquid.

The aforementioned polymerization initiator and chain transfer agent may be used upon polymerization of the addition-polymerizable monomer.

(Colorant)

Examples of the colorant that can be used in the toner of the invention include various kinds of pigments, such as carbon black, Chrome Yellow, Hansa Yellow, Benzidine Yellow, Threne Yellow, Quinoline Yellow, Permanent Orange GTR, Pyrazolone Orange, Vulkan Orange, Watchyoung Red, Permanent Red, Brilliant Carmine 3B, Brilliant Carmine 6B, Du Pont Oil Red, Pyrazolone Red, Lithol Red, Rhodamine B Lake, Lake Red C, Rose Bengal, Aniline Blue, Ultramarine Blue, Calco Oil Blue, Methylene Blue Chloride, Phthalocyanine Blue, Phthalocyanine Green, Malachite Green Oxalate and Titanium Black, and various kinds of dyes, such as an acridine series, a xanthone series, an azo series, a benzoquinone series, an azine series, an anthraquinone series, a thioindigo series, a dioxazine series, a thiazine series, an azomethine series, an indigo series, a thioindigo series, a phthalocyanine series, an aniline black series, a polymethine series, a triphenylmethane series, a diphenylmethane series, a thiazine series, a thiazole series and a xanthone series. Specific preferred examples thereof include carbon black, a nigrosine dye (C.I. No. 50415B), Aniline Blue (C.I. No. 50405), Calco Oil Blue (C.I. No. azoic Blue 3), Chrome Yellow (C.I. No. 14090), Ultramarine Blue (C.I. No. 77103), Du Pont Oil Red (C.I. No. 26105), Quinoline Yellow (C.I. No. 47005), Methylene Blue Chloride (C.I. No. 52015), Phthalocyanine Blue (C.I. No. 74160), Malachite Green Oxalate (C.I. No. 42000), Lamp Black (C.I. No. 77266), Rose Bengal (C.I. No. 45435), and mixtures thereof.

The using amount of the colorant is generally from 0.1 to 20 parts by weight, and particularly preferably from 0.5 to 10 parts by weight, per 100 parts by weight of the toner. The pigments and dyes may be used solely or in combination of two or more kinds thereof as the colorant.

The dispersing method of the colorant may be an arbitrary method, such as an ordinary dispersing method using a rotation shearing homogenizer or a mill containing media, e.g., a ball mill, a sand mill and a Dinor mill, without any limitation. The color ant particles may be added at one time to a mixed solvent along with the other particle components, or may be added by dividing into plural parts or added stepwise.

The toner for developing an electrostatic image of the invention may contain a magnetic material or a property improving agent depending on necessity.

Examples of the magnetic material include a ferromagnetic metal or alloy, such as iron, cobalt and nickel, and ferrite and magnetite, a compound containing these element, an alloy that does not contain a ferromagnetic element but exhibits ferromagnetism through an appropriate heat treatment, such as a whistler alloy containing manganese and copper, e.g., manganese-copper-aluminum and manganese-copper-tin, and chromium dioxide. In the case where a black toner is to be obtained, for example, magnetite is particularly preferably used since it has black color by itself to exert the function of a colorant. In the case where a color toner is to be obtained, a magnetic material having less black color, such as metallic iron, is preferably used. Some materials among the magnetic materials exert the function of a colorant, and in this case, the magnetic material may be used as a colorant. The content of the magnetic material is preferably from 20 to 70 parts by weight, and more preferably from 40 to 70 parts by weight, per 100 parts by weight of the toner.

Examples of the property improving agent include a fixing property improving agent and a charge controlling agent.

Examples of the fixing property improving agent include a polyolefin, a fatty acid metallic salt, a fatty acid ester and fatty acid ester wax, a partially saponified fatty acid ester, a higher fatty acid, a higher alcohol, fluidized or solid paraffin wax, polyamide wax, a polyvalent alcohol ester, a silicone varnish and a aliphatic fluorocarbon. In particular, wax having a softening temperature (ring and ball method according to JIS K2207 (1996)) of from 60 to 150° C. is preferred.

Examples of the charge controlling agent include those having been known, such as a nigrosine dye and a metal-containing dye.

The toner of the invention is preferably used after mixing inorganic particles, such as a fluidity improving agent.

The inorganic particles used in the invention may have a primary particle diameter of from 5 nm to 2 μA, and preferably from 5 to 500 nm, and preferably have a BET specific surface area of from 20 to 500 m²/g. The mixing ratio of the inorganic particles in the toner may be from 0.01 to 5% by weight, and preferably from 0.01 to 2.0% by weight. Examples of the inorganic particles include silica powder, alumina, titanium oxide, barium titanate, magnesium titanate, calcium titanate, strontium titanate, zinc oxide, silica sand, clay, mica, wollastonite, diatom earth, chromium oxide, cerium oxide, red iron oxide, antimony trioxide, magnesium oxide, zirconium oxide, barium sulfate, barium carbonate, calcium carbonate, silicon carbide and silicon nitride, and silica powder is particularly preferred.

The silica powder referred herein is powder having an Si—O—Si bond and includes those obtained by both a dry method and a wet method. In addition to anhydrous silicon dioxide, any of aluminum silicate, sodium silicate, potassium silicate, magnesium silicate, zinc silicate and the like may be used, and silica powder containing $SiO_2$ in an amount of 85% by weight or more is preferred.

Specific examples of the silica powder include various kinds of commercially available silica, and silica powder having a hydrophobic group on the surface thereof is preferred, examples of which include Aerosil R-972, R-974, R-805 and R-812 (all produced by Aerosil Co., Ltd.), and Turax 500 (produced by Talco Ltd.). In addition, silica powder having been treated with a silane coupling agent, a titanium coupling agent, a silicone oil, a silicone oil having an amine on a side chain, or the like may also be used.

The toner obtained by the production method of a toner for developing an electrostatic image of the invention preferably has an accumulated volume average particle diameter $D_{50}$ of from 3.0 to 9.0 μm, and more preferably from 3.0 to 5.0 μm. In the case where $D_{50}$ is 3.0 μm or more, it is preferred since an appropriate adhesion power is obtained, and good developing property is obtained. In the case where $D_{50}$ is 9.0 μm or less, it is preferred since good resolution of an image is obtained.

The resulting toner preferably has a volume average particle size distribution index GSDv of 1.30 or less, more preferably 1.24 or less, and further preferably 1.20 or less. In the case where GSDv is 1.30 or less, it is preferred since good resolution is obtained, and scattering of the toner and image defects, such as fogging, do not occur.

The accumulated volume average particle diameter $D_{50}$ and the volume average particle size distribution index GSDv are obtained, for example, in the following manner. A particle size distribution of the toner measured by measuring equipments, such as Coulter Counter TAII (produced by Beckman Coulter, Inc.) and Multisizer (produced by Beckman Coulter, Inc.), is divided into particle size ranges (channels), and accumulated distributions of the volume and the number of the particles are drawn for the channels from the small diameter side. The particle diameters providing an accumulation of 16% are designated as a volume average particle diameter $D_{16V}$ and a number average particle diameter $D_{16P}$, the particle diameters providing an accumulation of 50% are designated as a volume average particle diameter $D_{50V}$ and a number average particle diameter $D_{50P}$, and the particle diameters providing an accumulation of 84% are designated as a volume average particle diameter $D_{84V}$ and a number average particle diameter $D_{84P}$. The volume average particle size distribution index GSDv is defined by $(D_{84V}/D_{16V})^{1/2}$ and the number average particle size distribution index GSDp is defined by $(D_{84P}/D_{16P})^{1/2}$.

The resulting toner preferably has a shape factor SF1 of from 100 to 140, and more preferably from 110 to 135, from the standpoint of image forming property.

The shape factor SF1 is digitalized by analyzing a micrograph or an electron micrograph with an image analyzer, and can be obtained, for example, in the following manner. An optical micrograph of the toner scattered on slide glass is loaded to a Luzex image analyzer through a video camera. The shape factor SF1 is obtained for 50 or more toner particles according to the following equation, and the average value thereof is obtained.

$$SF1=((ML)^2/A)\times(\pi/4)\times 100$$

wherein ML represents the maximum length of the toner particle, and A represents the projected area of the toner particle.

The resulting toner is dried as similar to an ordinary toner for imparting fluidity and improving in cleaning property, and then inorganic particles, such as silica, alumina, titania and calcium carbonate, and resin particles, such as a vinyl resin, polyester and silicone, are added to the toner surface in a dried state under application of a shearing force.

In the case where the inorganic particles are attached to the toner surface in an aqueous medium, examples of the inorganic particles include those generally used as an external additive to the toner surface, such as silica, alumina, titania, calcium carbonate, magnesium carbonate and tricalcium phosphate, which can be used after dispersing with an ionic surfactant, a polymer acid or a polymer base.

(Developer for Electrostatic Image)

The toner obtained by the production method of a toner for developing an electrostatic image of the invention can be used as a developer for developing an electrostatic image. The developer is not particularly limited as far as it contains the toner for developing an electrostatic image, and may appropriately contain other components depending on necessity. In the case where the toner for developing an electrostatic image is used solely, a one-component developer for developing an electrostatic image is prepared, and in the case where the toner is used in combination with a carrier, a two-component developer for developing an electrostatic image is prepared.

The carrier that can be used in the invention is not particularly limited, and examples thereof include magnetic particles, such as iron powder, ferrite, iron oxide powder and nickel; a resin-coated carrier containing the magnetic powder as a core material having coated on the surface thereof with a resin, such as a styrene resin, a vinyl resin, an ethylene resin, a rosin resin, a polyester resin and a melamine resin, or wax, such as stearic acid, to form a resin coated layer; and a magnetic material dispersed carrier containing magnetic particles dispersed in a binder resin. Among these, a resin-coated carrier is particularly preferred since the charging property of the toner and the total resistance of the carrier can be controlled with the constitution of the resin coated layer.

The mixing ratio of the toner of the invention and a carrier in the two-component developer for developing an electrostatic image is generally from 2 to 10 parts of the toner per 100 parts by weight of the carrier. The preparation method of the developer is not particularly limited, and examples thereof include a method of mixing with a V blender.

(Method for Forming Image)

The method for forming an image of the invention contains steps of forming an electrostatic latent image on a surface of a latent image carrying member, developing the electrostatic latent image formed on the surface of the latent image carrying member, with a developer containing a toner, to form a toner image, transferring the toner image formed on the surface of the latent image carrying member, to a surface of a transfer material, and thermally fixing the toner image transferred to the surface of the transfer material, and the toner is the toner for developing an electrostatic image of the invention, or the developer is the developer for developing an electrostatic image of the invention.

In the method for forming an image of the invention, for example, a developer is prepared by using the particular toner, and an electrostatic image is formed and developed with an ordinary electrophotographic duplicator by using the developer. The toner image thus obtained is electrostatically transferred to transfer paper and fixed with a heating roller, which has been set at a constant temperature, to form a duplicated image.

The method for forming an image of the invention is preferably employed particularly in the case where a high speed fixing operation is carried out, in which the contact time between the toner on the transfer paper and the heating roller is 1 second or less, particularly 0.5 second or less.

The developer for developing an electrostatic image (toner for developing an electrostatic image) of the invention may be used for a method for forming an image of an ordinary electrostatic developing system (electrophotographic system). The method for forming an image of the invention may specifically contain, for example, an electrostatic latent image forming step, a toner image forming step, a transferring step and a cleaning step. These steps each are ordinary process steps by themselves, and are described, for example, in JP-A-56-40868 and JP-A-49-91231. The method for forming an image of the invention may be practiced by using a known image forming apparatus, such as a duplicator or a facsimile machine.

The electrostatic latent image forming step is a step of forming an electrostatic latent image on a surface of a latent image carrying member. The toner image forming step is a step of developing the electrostatic latent image formed on the surface of the latent image carrying member, with a developer layer on a developer carrying member, to form a toner image. The developer layer is not particularly limited as far as it contains the developer for developing an electrostatic image of the invention containing the toner for developing an electrostatic image of the invention. The transferring step is a step of transferring the toner image to a surface of a transfer material. The cleaning step is a step of removing the developer for developing an electrostatic image remaining on the electrostatic latent image carrying member.

The method for forming an image of the invention preferably further contains a recycling step. In the recycling step, the toner for developing an electrostatic image recovered in the cleaning step is moved to the developer layer. The method for forming an image containing the recycling step can be practiced in an image forming apparatus, such as a duplicator or a facsimile machine, having a toner recycling system. Furthermore, the method for forming an image of the invention can also be applied to a recycling system, in which a toner is recovered simultaneously with development to omit a cleaning step.

EXAMPLE

The invention will be described in detail below with reference to examples, but the invention is not construed as being limited thereto. In the following description, all "parts" are "parts by weight" unless otherwise indicated.

Production of Resin Particle Dispersion Liquids L1 to L3

Example 1

Production of Resin P1

| | |
|---|---|
| Bisphenol A ethylene oxide 2 mol adduct (BPA-2EO) | 24.66 parts by weight |
| Bisphenoxyethanol (both terminals 2 mol adduct) (BPEF-2EO) | 8.51 parts by weight |
| 1,4-Cyclohexanedicarboxylic acid (CHDA) | 5.06 parts by weight |
| Trimellitic anhydride | 1.87 parts by weight |
| Dodecylbenzenesulfonic acid (DBSA) | 0.128 part by weight |

The aforementioned materials are mixed and placed in a reactor equipped with an agitator, and the mixture is subjected to polycondensation in an open system at a resin temperature of 120° C. for 20 hours to obtain a uniform transparent non-crystalline polyester resin P1.

A small amount of the resin is sampled and measured for the following properties.

| | |
|---|---|
| Weight average molecular weight by GPC | 45,600 |
| Glass transition temperature (onset) | 65° C. |
| Acid value of resin | 2.1 mg · KOH/g |

In the measurement of the molecular weight, a weight average molecular weight Mw and a number average molecular weight are measured by gel permeation chromatography (GPC) under the following conditions. A solvent (tetrahydrofuran) is flown at a temperature of 40° C. at a flow rate of 1.2 mL/min, and 3 mg in terms of sample weight of a tetrahydrofuran solution of the sample having a concentration of 0.2 g per 20 mL is injected and measured. Upon measurement of the molecular weight of the sample, such measurement conditions are selected that the molecular weight of the sample is encompassed in the range that has a linear calibration line between logarithm of the molecular weight and the count number produced with plural monodisperse polystyrene standard samples.

The reliability of the measured results can be confirmed by the following molecular weights of the NBS706 standard polystyrene sample measured under the aforementioned conditions.

Weight average molecular weight $Mw=28.8\times10^4$

Number average molecular weight $Mn=13.7\times10^4$

As a column for GPC, TSK-GEL, GMH (produced by Tosoh Corp.) satisfying the aforementioned conditions is used.

The measurement of the glass transition temperature Tg of the polyester is carried out by using a differential scanning calorimeter (DSC50, Produced by Shimadzu Corp.)

(Production of Resin Particle Dispersion Liquid L1)

30 parts by weight of the resin P1 having been produced according to the above is weighed and placed in the similar reactor equipped with an agitator, to which 0.90 part by weight of dodecanoic acid is added thereto, and the mixture is agitated at 120° C. for 0.5 hour to accelerate plasticization of the resin.

Thereafter, 1.36 parts by weight of trimellitic anhydride is added to and completely dissolved in 45 parts by weight of a 0.2 mol/L sodium hydroxide aqueous solution heated to 90° C., and the sodium hydroxide aqueous solution having trimellitic anhydride dissolved therein and maintained at 90° C. is added to the resin, followed by agitating for 30 minutes. After lapsing 30 minutes, 4 parts by weight of a 1 mol/L sodium hydroxide aqueous solution is added thereto, followed by agitating for 2 hours, to obtain a polyester aqueous dispersion liquid.

Thereafter, the dispersion liquid is agitated with a homogenizer (Ultra-Turrax T50, produced by IKA Japan Co., Ltd.) for 3 minutes. The presence of the resin that is remained undispersed in the resin particle dispersion is confirmed, but the resin is entirely dispersed in water, and no resin remained undispersed is found. Thus, a resin particle dispersion liquid having a solid content of 40% is obtained.

According to the aforementioned method, a non-crystalline polyester resin particle dispersion liquid L1 having a median diameter of particles of 170 nm is obtained.

The particle diameter of the resulting resin particle dispersion liquid is measured with a laser diffraction particle size distribution measuring device (LA-920, produced by Horiba, Ltd.).

The resulting resin particle dispersion liquid is placed in a 50-mL polypropylene centrifuging tube (30 mm in diameter and 118 mm in height), and subjected to centrifugal separation at 2,000 rpm for 10 minutes. Samples are obtained from the supernatant liquid and the bottom part of the test tube, which are subjected to measurement of particle diameter with LA-920. As a result, the following results are obtained, and thus no unevenness occurs in particle size distribution.

| | |
|---|---|
| Median diameter of supernatant of dispersion liquid: | 170 nm |
| Median diameter of bottom part of dispersion liquid: | 180 nm |
| Ratio of (median diameter of supernatant)/(median diameter of bottom part): | 0.94 |

The centrifugal machine used for the centrifugal separation is Hitachi Compact Desktop Centrifugal Machine (Himac C T41, produced by Hitachi High-Technologies Corp.).

A small amount of a sample collected from the resin particle dispersion liquid obtained above is air-dried and measured for neutralization degree shown by the expression (1) with an infrared spectrophotometer. The neutralization degree is 0.86.

The infrared spectrophotometer used for measuring the neutralization degree shown by the expression (1) is FT/IR-410, produced by JASCO Corp. Upon measuring with this measuring equipment, the measurement is effected in such a manner that about 40 mg of KBr powder and about 0.2 mg of a measuring sample (concentration: 0.5%) are sufficiently pulverized and mixed in a mortar, and the mixture is molded under pressure and then subjected to the measurement.

Example 2

Production of Resin Particle Dispersion Liquid L2

30 parts by weight of the resin P1 having been produced according to the above is weighed and placed in the similar reactor equipped with an agitator, to which 0.06 part by weight of hexanoic acid is added thereto, and the mixture is agitated at 120° C. for 0.5 hour to accelerate plasticization of the resin.

Thereafter, 0.15 parts by weight of trimellitic anhydride is added to and completely dissolved in 45 parts by weight of a 0.2 mol/L sodium hydroxide aqueous solution heated to 90° C., and furthermore, 0.3 part by weight of sodium dodecylbenzenesulfonate (DBSA-Na) as an activating agent is added to the sodium hydroxide aqueous solution having trimellitic anhydride dissolved therein and maintained at 90° C. The sodium hydroxide aqueous solution maintained at 90° C. is added to the resin, followed by agitating for 30 minutes. After lapsing 30 minutes, 1 part by weight of a 1 mol/L sodium hydroxide aqueous solution and 3 parts by weight of water are added thereto, followed by agitating for 2 hours, to obtain a polyester aqueous dispersion liquid.

Thereafter, the dispersion liquid is agitated with a homogenizer (Ultra-Turrax T50, produced by IKA Japan Co., Ltd.) for 3 minutes. The presence of the resin that is remained undispersed in the resin particle dispersion is confirmed, but the resin is entirely dispersed in water, and no resin remained undispersed is found. Thus, a resin particle dispersion liquid having a solid content of 40% is obtained.

According to the aforementioned method, a non-crystalline polyester resin particle dispersion liquid L2 having a median diameter of particles of 190 nm is obtained.

The particle diameter of the resulting resin particle dispersion liquid is measured with a laser diffraction particle size distribution measuring device (LA-920, produced by Horiba, Ltd.).

A small amount of the resulting resin particle dispersion liquid is placed in a test tube, and subjected to centrifugal separation at 2,000 rpm for 10 minutes. Samples are obtained from the supernatant liquid and the bottom part of the test tube, which are subjected to measurement of particle diameter with LA-920. As a result, the following results are obtained, and thus no unevenness occurs in particle size distribution.

| | |
|---|---|
| Median diameter of supernatant of dispersion liquid: | 190 nm |
| Median diameter of bottom part of dispersion liquid: | 190 nm |
| Ratio of (median diameter of supernatant)/(median diameter of bottom part): | 1.00 |

A small amount of a sample collected from the resin particle dispersion liquid obtained above is air-dried and measured for neutralization degree shown by the expression (1) with an infrared spectrophotometer. The neutralization degree is 0.41.

Example 3

Production of Resin Particle Dispersion Liquid L3

30 parts by weight of the resin P1 having been produced according to the above is weighed and placed in the similar reactor equipped with an agitator, to which 3.00 parts by weight of hexadecanoic acid is added thereto, and the mixture is agitated at 120° C. for 0.5 hour to accelerate plasticization of the resin.

Thereafter, 6.00 parts by weight of pyromellitic acid is added to and completely dissolved in 45 parts by weight of a 0.2 mol/L sodium hydroxide aqueous solution heated to 90° C., and the sodium hydroxide aqueous solution having pyromellitic acid dissolved therein and maintained at 90° C. is added to the resin, followed by agitating for 30 minutes. After lapsing 30 minutes, 4 parts by weight of a 1 mol/L sodium hydroxide aqueous solution is added thereto, followed by agitating for 2 hours, to obtain a polyester aqueous dispersion liquid.

Thereafter, the dispersion liquid is agitated with a homogenizer (Ultra-Turrax T50, produced by IKA Japan Co., Ltd.) for 3 minutes. The presence of the resin that is remained undispersed in the resin particle dispersion is confirmed, but the resin is entirely dispersed in water, and no resin remained undispersed is found. Thus, a resin particle dispersion liquid having a solid content of 40% is obtained.

According to the aforementioned method, a non-crystalline polyester resin particle dispersion liquid L3 having a median diameter of particles of 170 nm is obtained.

The particle diameter of the resulting resin particle dispersion liquid is measured with a laser diffraction particle size distribution measuring device (LA-920, produced by Horiba, Ltd.).

A small amount of the resulting resin particle dispersion liquid is placed in a test tube, and subjected to centrifugal separation at 2,000 rpm for 10 minutes. Samples are obtained from the supernatant liquid and the bottom part of the test tube, which are subjected to measurement of particle diameter with LA-920. As a result, the following results are obtained, and thus no unevenness occurs in particle size distribution.

| | |
|---|---|
| Median diameter of supernatant of dispersion liquid: | 170 nm |
| Median diameter of bottom part of dispersion liquid: | 180 nm |
| Ratio of (median diameter of supernatant)/(median diameter of bottom part): | 0.94 |

A small amount of a sample collected from the resin particle dispersion liquid obtained above is air-dried and measured for neutralization degree shown by the expression (1) with an infrared spectrophotometer. The neutralization degree is 0.86.

Example 4

Production of Resin Particle Dispersion Liquid L4

(Production of Resin P2)

| | |
|---|---|
| Bisphenol A propylene oxide 2 mol adduct (BPA-2PO) | 31.61 parts by weight |
| 1,4-Phenylenediacetic acid (PDAA) | 16.06 parts by weight |
| Pyromellitic acid | 2.33 parts by weight |
| Dodecylbenzenesulfonic acid | 0.114 part by weight |

The aforementioned materials are mixed and placed in a reactor equipped with an agitator, and the mixture is subjected to polycondensation in an open system at a resin temperature of 120° C. for 20 hours to obtain a uniform transparent non-crystalline polyester resin P2.

A small amount of the resin is sampled and measured for the following properties.

| | |
|---|---|
| Weight average molecular weight by GPC | 48,580 |
| Glass transition temperature (onset) | 62° C. |
| Acid value of resin | 9.1 mg · KOH/g |

(Production of Resin Particle Dispersion Liquid L4)

30 parts by weight of the resin P2 having been produced according to the above is weighed and placed in the similar reactor equipped with an agitator, to which 1.20 parts by weight of oleic acid is added thereto, and the mixture is agitated at 120° C. for 0.5 hour to accelerate plasticization of the resin.

Thereafter, 4.00 parts by weight of trimesic acid is added to and completely dissolved in 45 parts by weight of a 0.2 mol/L sodium hydroxide aqueous solution heated to 90° C., and the sodium hydroxide aqueous solution having trimesic acid dissolved therein and maintained at 90° C. is added to the resin, followed by agitating for 30 minutes. After lapsing 30 minutes, 4 parts by weight of a 1 mol/L sodium hydroxide aqueous solution is added thereto, followed by agitating for 2 hours, to obtain a polyester aqueous dispersion liquid.

Thereafter, the dispersion liquid is agitated with a homogenizer (Ultra-Turrax T50, produced by IKA Japan Co., Ltd.) for 3 minutes. The presence of the resin that is remained undispersed in the resin particle dispersion is confirmed, but the resin is entirely dispersed in water, and no resin remained undispersed is found. Thus, a resin particle dispersion liquid having a solid content of 40% is obtained.

According to the aforementioned method, a non-crystalline polyester resin particle dispersion liquid L4 having a median diameter of particles of 200 nm is obtained.

The particle diameter of the resulting resin particle dispersion liquid is measured with a laser diffraction particle size distribution measuring device (LA-920, produced by Horiba, Ltd.).

A small amount of the resulting resin particle dispersion liquid is placed in a test tube, and subjected to centrifugal separation at 2,000 rpm for 10 minutes. Samples are obtained from the supernatant liquid and the bottom part of the test tube, which are subjected to measurement of particle diameter with LA-920. As a result, the following results are obtained, and thus no unevenness occurs in particle size distribution.

| | |
|---|---|
| Median diameter of supernatant of dispersion liquid: | 180 nm |
| Median diameter of bottom part of dispersion liquid: | 200 nm |
| Ratio of (median diameter of supernatant)/ (median diameter of bottom part): | 0.90 |

A small amount of a sample collected from the resin particle dispersion liquid obtained above is air-dried and measured for neutralization degree shown by the expression (1) with an infrared spectrophotometer. The neutralization degree is 0.81.

(Production of Resin Particle Dispersion Liquid L5)

30 parts by weight of the resin P1 having been produced according to the above is weighed and placed in the similar reactor equipped with an agitator, to which 0.90 part by weight of dodecanoic acid is added thereto, and the mixture is agitated at 120° C. for 0.5 hour to accelerate plasticization of the resin.

Thereafter, 3.0 parts by weight of styrene is added to the resin, which is then impregnated with styrene, and the mixture is agitated at 120° C. for about 5 minutes until the viscosity of the resin is sufficiently lowered. 1.36 parts by weight of trimellitic anhydride is added to and completely dissolved in 45 parts by weight of a 0.2 mol/L sodium hydroxide aqueous solution heated to 90° C., and the sodium hydroxide aqueous solution having trimellitic anhydride dissolved therein and maintained at 90° C. is added to the resin, followed by agitating for 30 minutes. After lapsing 30 minutes, 4 parts by weight of a 1 mol/L sodium hydroxide aqueous solution is added thereto, followed by agitating for 2 hours, to obtain a polyester aqueous dispersion liquid.

Furthermore, 0.15 part by weight of ammonium persulfate (APS) is added, and radical polymerization is carried out at a polymerization temperature of 80° C. for 2 hours, followed by quenching the resulting resin particle dispersion liquid to terminate the polymerization.

Thereafter, the dispersion liquid is agitated with a homogenizer (Ultra-Turrax T50, produced by IKA Japan Co., Ltd.) for 3 minutes. The presence of the resin that is remained undispersed in the resin particle dispersion is confirmed, but the resin is entirely dispersed in water, and no resin remained undispersed is found. Thus, a resin particle dispersion liquid having a solid content of 41% is obtained.

According to the aforementioned method, a non-crystalline polyester resin particle dispersion liquid L5 having a median diameter of particles of 260 nm is obtained.

The particle diameter of the resulting resin particle dispersion liquid is measured with a laser diffraction particle size distribution measuring device (LA-920, produced by Horiba, Ltd.).

A small amount of the resulting resin particle dispersion liquid is placed in a test tube, and subjected to centrifugal separation at 2,000 rpm for 10 minutes. Samples are obtained from the supernatant liquid and the bottom part of the test tube, which are subjected to measurement of particle diameter with LA-920. As a result, the following results are obtained, and thus no unevenness occurs in particle size distribution.

| | |
|---|---|
| Median diameter of supernatant of dispersion liquid: | 250 nm |
| Median diameter of bottom part of dispersion liquid: | 260 nm |
| Ratio of (median diameter of supernatant)/ (median diameter of bottom part): | 0.96 |

A small amount of a sample collected from the resin particle dispersion liquid obtained above is air-dried and measured for neutralization degree shown by the expression (1) with an infrared spectrophotometer. The neutralization degree is 0.79.

Comparative Example 1

Production of Resin Particle Dispersion Liquid L6

30 parts by weight of the resin P2 having been produced according to the above is weighed and placed in the similar reactor equipped with an agitator, to which 0.03 part by weight of linolenic acid is added thereto, and the mixture is agitated at 120° C. for 0.5 hour to accelerate plasticization of the resin.

Thereafter, 6.60 parts by weight of isophthalic acid is added to and dissolved in 45 parts by weight of a 0.2 mol/L sodium hydroxide aqueous solution heated to 90° C., and the sodium hydroxide aqueous solution maintained at 90° C. is added to the resin, followed by agitating for 30 minutes. After lapsing 30 minutes, 4 parts by weight of a 1 mol/L sodium hydroxide aqueous solution is added thereto, followed by agitating for 2 hours, to obtain a polyester aqueous dispersion liquid.

Thereafter, the dispersion liquid is agitated with a homogenizer (Ultra-Turrax T50, produced by IKA Japan Co., Ltd.) for 3 minutes. The presence of the resin that is remained undispersed in the resin particle dispersion is confirmed, but most of the resin is not dispersed in water and remains undispersed. Thus, the resin particle dispersion has a solid content of 8.5%.

According to the aforementioned method, a non-crystalline polyester resin particle dispersion liquid L6 having a median diameter of particles of 1,050 nm is obtained.

The particle diameter of the resulting resin particle dispersion liquid is measured with a laser diffraction particle size distribution measuring device (LA-920, produced by Horiba, Ltd.).

A small amount of the resulting resin particle dispersion liquid is placed in a test tube, and subjected to centrifugal separation at 2,000 rpm for 10 minutes. Samples are obtained from the supernatant liquid and the bottom part of the test tube, which are subjected to measurement of particle diameter with LA-920. As a result, the following results are obtained, and thus unevenness occurs in particle size distribution.

| | |
|---|---|
| Median diameter of supernatant of dispersion liquid: | 550 nm |
| Median diameter of bottom part of dispersion liquid: | 2,040 nm |
| Ratio of (median diameter of supernatant)/(median diameter of bottom part): | 0.27 |

A small amount of a sample collected from the resin particle dispersion liquid obtained above is air-dried and measured for neutralization degree shown by the expression (1) with an infrared spectrophotometer. The neutralization degree is 0.22.

Comparative Example 2

Production of Resin Particle Dispersion Liquid L7

30 parts by weight of the resin P2 having been produced according to the above is weighed and placed in the similar reactor equipped with an agitator, to which 0.03 part by weight of triacontanoic acid is added thereto, and the mixture is agitated at 120° C. for 0.5 hour to accelerate plasticization of the resin.

Thereafter, 6.60 parts by weight of phthalic anhydride is added to and dissolved in 45 parts by weight of a 0.2 mol/L sodium hydroxide aqueous solution heated to 90° C., and the sodium hydroxide aqueous solution maintained at 90° C. is added to the resin, followed by agitating for 30 minutes. After lapsing 30 minutes, 4 parts by weight of a 1 mol/L sodium hydroxide aqueous solution is added thereto, followed by agitating for 2 hours, to obtain a polyester aqueous dispersion liquid.

Thereafter, the dispersion liquid is agitated with a homogenizer (Ultra-Turrax T50, produced by IKA Japan Co., Ltd.) for 3 minutes. The presence of the resin that is remained undispersed in the resin particle dispersion is confirmed, but a part of the resin is not dispersed in water and remains undispersed. Thus, a resin particle dispersion liquid having a solid content of 25.5% is obtained. The resin remaining undispersed is in the form of a white viscous matter, which cannot be emulsified any more.

According to the aforementioned method, a non-crystalline polyester resin particle dispersion liquid L7 having a median diameter of particles of 5,650 nm is obtained.

The particle diameter of the resulting resin particle dispersion liquid is measured with a laser diffraction particle size distribution measuring device (LA-920, produced by Horiba, Ltd.).

A small amount of the resulting resin particle dispersion liquid is placed in a test tube, and subjected to centrifugal separation at 2,000 rpm for 10 minutes. Samples are obtained from the supernatant liquid and the bottom part of the test tube, which are subjected to measurement of particle diameter with LA-920. As a result, the following results are obtained, and thus unevenness occurs in particle size distribution.

| | |
|---|---|
| Median diameter of supernatant of dispersion liquid: | 1,060 nm |
| Median diameter of bottom part of dispersion liquid: | 7,070 nm |
| Ratio of (median diameter of supernatant)/(median diameter of bottom part): | 0.15 |

A small amount of a sample collected from the resin particle dispersion liquid obtained above is air-dried and measured for neutralization degree shown by the expression (1) with an infrared spectrophotometer. The neutralization degree is 0.98.

Comparative Example 3

Production of Resin P3

| | |
|---|---|
| Bisphenol A ethylene oxide 4 mol adduct (BPA-4EO) | 31.61 parts by weight |
| 1,4-Phenylenediacetic acid | 16.06 parts by weight |
| Dodecylbenzenesulfonic acid | 0.114 part by weight |

The aforementioned materials are mixed and placed in a reactor equipped with an agitator, and the mixture is subjected to polycondensation in an open system at a resin temperature of 120° C. for 20 hours to obtain a uniform transparent non-crystalline polyester resin P3.

A small amount of the resin is sampled and measured for the following properties.

| | |
|---|---|
| Weight average molecular weight by GPC | 15,650 |
| Glass transition temperature (onset) | 53° C. |
| Acid value of resin | 15.5 mg · KOH/g |

(Production of Resin Particle Dispersion Liquid L8)

30 parts by weight of the resin P3 having been produced according to the above is weighed and placed in the similar reactor equipped with an agitator, to which 0.03 part by weight of triacontanoic acid is added thereto, and the mixture is agitated at 120° C. for 0.5 hour to accelerate plasticization of the resin.

Thereafter, 2.0 parts by weight of benzenetetracarboxylic acid is added to and dissolved in 45 parts by weight of a 0.2 mol/L sodium hydroxide aqueous solution heated to 90° C., and the sodium hydroxide aqueous solution maintained at 90° C. is added to the resin, followed by agitating for 30 minutes. After lapsing 30 minutes, 4 parts by weight of a 1 mol/L sodium hydroxide aqueous solution is added thereto, followed by agitating for 2 hours, to obtain a polyester aqueous dispersion liquid.

Thereafter, the dispersion liquid is agitated with a homogenizer (Ultra-Turrax T50, produced by IKA Japan Co., Ltd.) for 3 minutes. The presence of the resin that is remained undispersed in the resin particle dispersion is confirmed, but the resin is entirely dispersed in water, and no resin remained undispersed is found. Thus, a resin particle dispersion liquid having a solid content of 40% is obtained.

According to the aforementioned method, a non-crystalline polyester resin particle dispersion liquid L8 having a median diameter of particles of 170 nm is obtained.

The particle diameter of the resulting resin particle dispersion liquid is measured with a laser diffraction particle size distribution measuring device (LA-920, produced by Horiba, Ltd.).

A small amount of the resulting resin particle dispersion liquid is placed in a test tube, and subjected to centrifugal separation at 2,000 rpm for 10 minutes. Samples are obtained from the supernatant liquid and the bottom part of the test tube, which are subjected to measurement of particle diameter with LA-920. As a result, the following results are obtained, and thus no unevenness occurs in particle size distribution.

| | |
|---|---|
| Median diameter of supernatant of dispersion liquid: | 170 nm |
| Median diameter of bottom part of dispersion liquid: | 180 nm |
| Ratio of (median diameter of supernatant)/ (median diameter of bottom part): | 0.94 |

A small amount of a sample collected from the resin particle dispersion liquid obtained above is air-dried and measured for neutralization degree shown by the expression (1) with an infrared spectrophotometer. The neutralization degree is 0.86.

For producing toners by using the resin particle dispersion liquids produced above as raw materials, a releasing agent particle dispersion liquid W1 and colorant particle dispersion liquids C1 and Y1 are produced in the following manner.

(Production of Releasing Agent Particle Dispersion Liquid W1)

| | |
|---|---|
| Polyethylene wax (Polywax 725, produced by Toyo Petrolite Co., Ltd., melting temperature: 103° C.) | 30 parts by weight |
| Cationic surfactant (Sanisol B50, produced by Kao Corp.) | 3 parts by weight |
| Ion exchanged water | 67 parts by weight |

The aforementioned materials are sufficiently dispersed under heating to 95° C. with a homogenizer (Ultra-Turrax T50, produced by IKA Japan Co., Ltd.), and is further subjected to a dispersion treatment with a pressure discharge homogenizer (Gorin Homogenizer, produced by Gorin Inc.) to produce a releasing agent particle dispersion liquid (W1). The releasing agent particles in the resulting dispersion liquid have a number average particle diameter $D_{50n}$ so is 460 nm. Ion exchanged water is added to the dispersion liquid to adjust the solid concentration of the dispersion liquid to 30%.

(Production of Cyan Pigment Dispersion Liquid C1)

| | |
|---|---|
| Cyan pigment (C.I. Pigment Blue 15:3, produced by Dainichiseika Color and Chemicals Mfg Co., Ltd.) | 20 parts by weight |
| Anionic surfactant (Neogen R, produced by Daiichi Kogyo Seiyaku Co., Ltd.) | 2 parts by weight |
| Ion exchanged water | 78 parts by weight |

The aforementioned materials are subjected to the same treatment as in the releasing agent particle dispersion liquid (W1) to obtain a cyan pigment dispersion liquid (C1) The pigment particles in the resulting dispersion liquid have a number average particle diameter $D_{50}$ is 121 nm. Ion exchanged water is added to the dispersion liquid to adjust the solid concentration of the dispersion liquid to 15%.

(Production of Yellow Pigment Dispersion Liquid Y1)

| | |
|---|---|
| Yellow pigment (C.I. Pigment Yellow 74, produced by Clariant Japan Co., Ltd.) | 20 parts by weight |
| Anionic surfactant (Neogen R, produced by Daiichi Kogyo Seiyaku Co., Ltd.) | 2 parts by weight |
| Ion exchanged water | 78 parts by weight |

The aforementioned materials are subjected to the same treatment as in the releasing agent particle dispersion liquid (W1) to obtain a yellow pigment dispersion liquid (Y1). The pigment particles in the resulting dispersion liquid have a number average particle diameter $D_{50n}$ is 118 nm. Ion exchanged water is added to the dispersion liquid to adjust the solid concentration of the dispersion liquid to 15%.

Production of Toner Particles

Toner Example 1

Production of Toner using Resin Particle Dispersion Liquid L1

| | |
|---|---|
| Resin particle dispersion liquid L1 | 160 parts by weight |
| Releasing agent dispersion liquid W1 | 33 parts by weight |
| Cyan pigment dispersion liquid C1 | 60 parts by weight |
| 10 wt % Polyaluminum chloride aqueous solution (PAC100W, produced by Asada Chemical Co., Ltd.) | 15 parts by weight |
| 1% Nitric acid aqueous solution | 3 parts by weight |

The aforementioned components are dispersed in a round-bottom stainless steel flask with a homogenizer (Ultra-Turrax T50, produced by IKA Japan Co., Ltd.) at 5,000 rpm for 3 minutes. The flask is then closed with a lid equipped with an agitator having a magnetic seal, a thermometer and a pH meter, and a mantle heater is set on the flask. The dispersion liquid in the flask is heated to 62° C. at a rate of 1° C. per minute under agitation at a minimum rotation number capable of agitating the entire dispersion liquid in the flask, followed by maintaining at 62° C. for 30 minutes, and then the particle diameter of the aggregated particles thus formed is measured with Coulter Counter TAII (produced by Nikkaki Co., Ltd.). 50 parts by weight of the resin particle dispersion liquid L1 is added, and after maintaining for 30 minutes, a sodium hydroxide aqueous solution is added until the pH of the system becomes 6.5, followed by heating to 97° C. at a rate of 1° C. per minute. After completing the temperature increase, a nitric acid aqueous solution is added to make the pH of the system of 5.0, and then the system is maintained for 10 hours to fuse the aggregated particles under heat.

The system is then cooled to 50° C., to which a sodium hydroxide aqueous solution is added to adjust the pH to 12, followed by maintaining for 10 minutes. The dispersion liquid is then taken out from the flask and sufficiently washed with ion exchanged water by passage of water and filtration, and the dispersion liquid again dispersed in ion exchanged water to a solid content of 10% by weight. Nitric acid is added to the dispersion liquid to make a pH of 3.0, and the dispersion liquid is agitated for 10 minutes, and then again sufficiently washed with ion exchanged water by passage of water and filtration. The resulting slurry is freeze-dried to obtain a cyan toner (toner C1).

The cyan colored particles thus obtained are added with silica (SiO$_2$) fine particles having an average primary particle diameter of 40 nm having been subjected to a surface hydrophobic treatment with hexamethyldisilazane (hereinafter, abbreviated as HMDS in some cases) in an amount of 1% by weight and metatitanic acid compound fine particles having an average primary particle diameter of 20 nm, which are a reaction product of metatitanic acid and isobutyltrimethoxysilane, in an amount of 1% by weight, and then mixed with a Hneschel mixer to produce an externally added cyan toner.

The toner particles thus obtained are measured for particle diameter with a Coulter Counter, and it is found that the accumulated volume average particle diameter $D_{50}$ is 4.86 μm, and the volume average particle size distribution index GSDv is 1.20. The shape factor SF1 of the toner particles obtained by shape observation with a Luzex image analyzer is 135, which shows a potato-like shape.

Toner Example 2

Production of Toner Using Resin Particle Dispersion Liquid L2

Cyan colored particles are obtained in the same manner as in Toner Example 1 except that the resin particle dispersion liquid L1 is changed to the resin particle dispersion liquid L2, and the accumulated volume average particle diameter $D_{50}$ and the volume average particle size distribution index GSDv thereof are measured. The sate external additive as in Toner Example 1 is added to the toner obtained herein to obtain an externally added cyan toner.

The toner obtained in Toner Example 2 has an accumulated volume average particle diameter $D_{50}$ of 4.71 μm, a volume average particle size distribution index GSDv 1.20, and a shape factor SF1 of 131, which shows a potato-like shape.

Toner Example 3

Production of Toner Using Resin Particle Dispersion Liquid L3

Cyan colored particles are obtained in the same manner as in Toner Example 1 except that the resin particle dispersion liquid L1 is changed to the resin particle dispersion liquid L3, and the accumulated volume average particle diameter $D_{50}$ and the volume average particle size distribution index GSDv thereof are measured. The same external additive as in Toner Example 1 is added to the toner obtained herein to obtain an externally added cyan toner.

The toner obtained in Toner Example 3 has an accumulated volume average particle diameter $D_{50}$ of 4.94 μm, a volume average particle size distribution index GSDv 1.20, and a shape factor SF1 of 131, which shows a potato-like shape.

Toner Example 4

Production of Toner Using Resin Particle Dispersion Liquid L4

Cyan colored particles are obtained in the same manner as in Toner Example 1 except that the resin particle dispersion liquid L1 is changed to the resin particle dispersion liquid L4, and the accumulated volume average particle diameter $D_{50}$ and the volume average particle size distribution index GSDv thereof are measured. The same external additive as in Toner Example 1 is added to the toner obtained herein to obtain an externally added cyan toner.

The toner obtained in Toner Example 4 has an accumulated volume average particle diameter $D_{50}$ of 4.35 μm, a volume average particle size distribution index GSDv 1.20, and a shape factor SF1 of 130, which shows a potato-like shape.

Toner Example 5

Production of Toner Using Resin Particle Dispersion Liquid L5

Cyan colored particles are obtained in the same manner as in Toner Example 1 except that the resin particle dispersion liquid L1 is changed to the resin particle dispersion liquid L5, and the accumulated volume average particle diameter $D_{50}$ and the volume average particle size distribution index GSDv thereof are measured. The same external additive as in Toner Example 1 is added to the toner obtained herein to obtain an externally added cyan toner.

The toner obtained in Toner Example 5 has an accumulated volume average particle diameter $D_{50}$ of 5.05 μm, a volume average particle size distribution index GSDv 1.19, and a shape factor SF1 of 127, which shows a slightly potato-like shape.

Toner Comparative Examples 1 to 3

Production of Toners Using Resin Particle Dispersion Liquids L6 to L8

Cyan colored particles are obtained in the same manner as in Toner Example 1 except that the resin particle dispersion liquid L1 is changed to the resin particle dispersion liquids L6 to L8, and the accumulated volume average particle diameter $D_{50}$ and the volume average particle size distribution index GSDv thereof are measured. The same external additive as in Toner Example 1 is added to the toners obtained herein to obtain an externally added cyan toners.

The toner obtained in Toner Comparative Example 1 using the resin particle dispersion liquid L6 has an accumulated volume average particle diameter $D_{50}$ of 5.77 μm, a volume average particle size distribution index GSDv 1.32, and a shape factor SF1 of 137.

The toner obtained in Toner Comparative Example 2 using the resin particle dispersion liquid L7 has an accumulated volume average particle diameter $D_{50}$ of 5.57 μm, a volume average particle size distribution index GSDv 1.45, and a shape factor SF1 of 133.

The toner obtained in Toner Comparative Example 3 using the resin particle dispersion liquid L8 has an accumulated volume average particle diameter $D_{50}$ of 4.55 μm, a volume average particle size distribution index GSDv 1.25, and a shape factor SF1 of 133.

(Production of Carrier)

A methanol solution containing 0.1 part by weight of γ-amino propyl triethoxysilane is added to 100 parts by weight of Cu—Zn ferrite particles having a volume average particle diameter of 35 μm, and the mixture is kneaded with a kneader to coat the silane compound on the particles. Methanol is then distilled off, and the particles are heated to 120° C. for 2 hours to cure the silane compound completely. A toluene solution having a perfluorooctylethyl methacrylate-methyl methacrylate copolymer (copolymerization ratio: 40/60) dissolved therein is added to the particles, and the mixture is subjected to a vacuum kneader to produce a resin-coated carrier having a coating amount of the perfluorooctylethyl methacrylate-methyl methacrylate copolymer of 0.5% by weight.

(Production of Developer)

8 parts by weight of each of the toners are added to 100 parts by weight of the resulting resin-coated carrier, respectively, and mixed with a V blender to produce developers for developing an electrostatic image.

The developers are applied to the following evaluation.

The toners and image quality are evaluated by using the developers in the following manner.

(Evaluation of Toner Particles and Image Quality)

(1) Evaluation of Fixing

The fixing property and the image quality with the developers obtained above are evaluated by using a modified machine of DocuCentre Color 500CP, produced by Fuji Xerox Co., Ltd., at a fixing temperature of 140° C. and a process speed of 240 mm/sec. The evaluation after storing in a high humidity condition is effected after storing the modified machine in an environment of a temperature of 35° C. and a humidity of 65% for 24 hours or more.

(1. Evaluation of Fogging in Non-Image Area Under High Humidity Condition)

A thin line image is fixed by using the modified machine, and a non-image area between the thin lines is measured with a reflective densitometer (X-Rite 404, produced by X-Rite, Inc.). In the case where the reflective density in the area suffering background fogging is increased by more than 0.01, it is evaluated as poor (C). In the case where reflective density is increased by 0.01 or less, it is evaluated as good (A).

The results of the evaluation of the toners reveal that in the case where the toners of Toner Examples 1 to 5 are used, no fogging is found, and the density increase in the measurement of the non-image area with X-Rite 404 is 0.01 or less.

In the case where the toners of Toner Comparative Examples 1 to 3 are used, the density increase in the measurement of the non-image area with X-Rite 404 is 0.01 or more, and slight fogging is visually found.

(2) Evaluation of Unevenness in Gloss of Secondary Color ($\Delta$Gloss)

Yellow toners are produced for fixing secondary color in the same manners as in the cyan toners of Toner Examples 1 to 5 and Toner Comparative Examples 1 to 3 by using the resin particle dispersion liquids L1 to L5 except that the colorant particle dispersion liquid C1 is changed to the colorant particle dispersion liquid Y1.

A non-fixed solid image of 5 cm×5 cm of green color, which is formed as secondary color of the cyan toner and the yellow toner, is formed, and fixed in the aforementioned manner. The fixed solid image is measured for gloss at five points including the center part and the peripheral part of the image, and a difference in gloss between the maximum value and the minimum value among the five measured values ($\Delta$Gloss=maximum gloss−minimum gloss) is obtained and evaluated by the following standard.

A (good): $\Delta$Gloss$\leq$4

B (fair): 4<$\Delta$Gloss<7

C (poor): 7$\leq$$\Delta$Gloss

The results of the evaluation of the toners reveal that the $\Delta$Gloss that is obtained by forming a fixed solid image of secondary color using the toners produced in Toner Examples 1 to 5 and measuring five points in the image for gloss is 4 or less, and no unevenness in gloss is visually observed. On the other hand, the $\Delta$Gloss that is obtained by forming a fixed solid image of secondary color using the toners produced in Toner Comparative Examples 1 to 3 and measuring five points in the image for gloss is 7 or more, and slight unevenness in gloss is visually observed.

(3) Evaluation of Image Quality (Difference in Solid Image Density $\Delta$ID After Continuous Printing Under High Humidity Condition)

The image quality after lapsing time under a high humidity condition is evaluated in the following manner. Solid images having C in of 100% are continuously printed with the modified machine having been stored in a high humidity condition for 24 hours or more. The difference in density $\Delta$ID between the first print and the print obtained after printing 50,000 sheets, i.e., the 50,001st print, is measured and evaluated by the following standard.

A (good): $\Delta$ID<0.05

B (fair): $\Delta$ID=0.05

C (poor): $\Delta$ID>0.05

The results of the evaluation of the toners reveal that the $\Delta$ID is less than 0.05 in the toners of Toner Examples 1 to 5, and no difference in density is visually observed. On the other hand, the $\Delta$ID is more than 0.05 in the toners of Toner Comparative Examples 1 to 3, and slight difference in density is visually observed.

The term "Cin" herein means an input halftone dot area ratio per unit area. In the case where C in is 100%, half tone dots completely occupy the unit area to form a solid image.

TABLE 1

| | Resin Example | | |
|---|---|---|---|
| | P1 | P2 | P3 |
| Alcohol 1 | BPA-2EO | BPA-2PO | BPA-4EO |
| Alcohol 2 | BPFE-2EO | — | — |
| Acid 1 | CHDA | PDAA | PDAA |
| Acid 2 | trimellitic anhydride | pyromellitic acid | — |
| Catalyst/concentration | DBSA/0.2 mol % | DBSA/0.2 mol % | DBSA/0.2 mol % |
| Polymerization temperature/time | 120° C./20 hr ordinary pressure | 120° C./20 hr ordinary pressure | 120° C./20 hr ordinary pressure |
| Mn | 6,950 | 10,650 | 6,650 |
| Mw | 45,600 | 48,580 | 15,650 |
| Mw/Mn | 6.56 | 4.56 | 2.35 |
| Glass transition temperature (° C.) | 65 | 62 | 53 |
| Acid value (mg · KOH/g) | 2.1 | 9.1 | 15.5 |

TABLE 2

| | Toner Example | | | | |
|---|---|---|---|---|---|
| | Example 1 | Example 2 | Example 3 | Example 4 | Example 5 |
| Resin | P1 | P1 | P1 | P2 | P1 |
| Additive 1 | dodecanoic acid 3.0 wt % | hexanoic acid 0.2 wt % | hexadecanoic acid 10 wt % | oleic acid 4.0 wt % | dodecanoic acid 3.0 wt % |

TABLE 2-continued

| | | | | | |
|---|---|---|---|---|---|
| Additive 2 | — | — | — | — | styrene |
| Other additive | — | — | — | — | APS |
| Divalent or higher acid 1 (addition method) | trimellitic anhydride 4.5 wt % (aqueous phase) | trimellitic acid 0.05 wt % (aqueous phase) | pyromellitic acid 20 wt % (aqueous phase) | trimesic acid 7.5 wt % (aqueous phase) | trimellitic anhydride 4.5 wt % |
| Other active agent | — | DBSA-Na | — | — | — |
| Neutralization degree | 0.86 | 0.41 | 0.86 | 0.81 | 0.79 |
| Median diameter (nm) | 170 | 190 | 170 | 200 | 260 |
| Solid concentration | A:40 | A:40 | A:40 | A:40 | A:41 |
| Ratio of median diameter {supernatent/bottom} | A:0.94 | A:1.00 | A:0.94 | A:0.90 | A:0.96 |
| $D_{50v}$ (μm) | 4.86 | 4.71 | 4.94 | 4.35 | 5.05 |
| GSDv | 1.20 | 1.20 | 1.20 | 1.20 | 1.19 |
| SF1 | 135 | 131 | 131 | 130 | 127 |
| Fogging | A | A | A | A | A |
| ΔGloss | A | A | A | A | A |
| ΔID | A | A | A | A | A |

| | Toner Example | | |
|---|---|---|---|
| | Comparative Example 1 | Comparative Example 2 | Comparative Example 3 |
| Resin | P2 | P2 | P3 |
| Additive 1 | linolenic acid 0.1 wt % | triacontanoic acid 11 wt % | triacontanoic acid 1 wt % |
| Additive 2 | — | — | — |
| Other additive | — | — | — |
| Divalent or higher acid 1 (addition method) | isophthalic acid 22 wt % | phthalic anhydride 0.03 wt % | benzenetetracarboxylic acid 6.7 wt % |
| Other active agent | — | — | — |
| Neutralization degree | 0.22 | 0.98 | 0.86 |
| Median diameter (nm) | 1,050 | 5,650 | 170 |
| Solid concentration | C:8.5 resin remaining undissolved | B:25.5 | A:40 |
| Ratio of median diameter (supernatant/bottom) | C:0.27 | C:0.150 | A:0.94 |
| $D_{50v}$ (μm) | 5.77 | 5.57 | 4.55 |
| GSDv | 1.32 | 1.45 | 1.25 |
| SF1 | 137 | 133 | 133 |
| Fogging | A | A | C |
| ΔGloss | B | C | C |
| ΔID | C | C | C |

What is claimed is:

1. A resin particle dispersion liquid comprising:

resin particles comprising polyester having terminal carboxyl groups, the polyester being obtained by polycondensation of a polycondensable monomer, wherein the polyester has the terminal carboxyl groups that are partially neutralized to form carboxyl anions, the resin particles in the resin particle dispersion liquid having a value of $(d_a/(d_a+d_c))$ of from approximately 0.30 to approximately 0.90, when in an absorption spectrum of the resin particles measured with an infrared spectrometer, $d_c$ represents a peak intensity of the terminal carboxyl group in a range of from 1,780 to 1,680 cm$^{-1}$, and $d_a$ represents a peak intensity of the neutralized carboxyl anion in a range of from 1,670 to 1,550 cm$^{-1}$, the polyester has an acid value of approximately 1 mg·KOH/g or more and less than approximately 15 mg·KOH/g before neutralization, the resin particle dispersion liquid comprises a divalent or higher organic acid selected from the group consisting of trimellitic anhydride, trimellitic acid, trimesic acid and pyromellitic acid in an amount of from approximately 0.1 to approximately 20 parts by weight per 100 parts by weight of the resin particles, and the resin particles have a median diameter of from approximately 0.1 to approximately 2.0 μm.

2. A resin particle dispersion liquid according to claim 1, wherein the resin particles have a weight average molecular weight of from 1,500 to 55,000.

3. A resin particle dispersion liquid according to claim 1, wherein the resin particles are crystalline polyester.

4. A resin particle dispersion liquid according to claim 3, wherein the resin particles have a crystalline melting temperature Tm of from 50 to 120° C.

5. A resin particle dispersion liquid according to claim 1, wherein the resin particles have a glass transition temperature Tg of from 50 to 80° C.

6. A resin particle dispersion liquid according to claim 1, further comprising at least one of a monocarboxylic acid having 4 or more carbon atoms and a salt thereof in an amount of from 0.05 to 5.0 parts by weight per 100 parts by weight of the resin particles.

7. A method for producing the resin particle dispersion liquid according to claim 1, the method comprising:

polycondensing a polycondensable monomer to obtain polyester having an acid value of approximately 1 mg·KOH/g or more and less than approximately 15 mg·KOH/g, dispersing the polyester and a divalent or higher organic acid in an aqueous medium, and partially neutralizing terminal carboxyl groups of the polyester.

8. A method for producing a toner for developing an electrostatic image, the method comprising:

aggregating resin particles in a resin particle dispersion liquid containing the resin particles to obtain aggregated particles, and integrating the aggregated particles by heating, wherein the resin particle dispersion liquid is the resin particle dispersion liquid according to claim 1.

9. A method for producing a toner for developing an electrostatic image, the method comprising:

aggregating resin particles in a resin particle dispersion liquid containing the resin particles to obtain aggregated particles, and integrating the aggregated particles by heating, wherein the resin particle dispersion liquid is a resin particle dispersion liquid produced by the method for producing a resin particle dispersion according to claim 7.

* * * * *